United States Patent
Haggerty et al.

(10) Patent No.: US 9,247,424 B2
(45) Date of Patent: Jan. 26, 2016

(54) METHODS AND APPARATUS FOR LARGE SCALE DISTRIBUTION OF ELECTRONIC ACCESS CLIENTS

(71) Applicant: Apple Inc., Cupertino, CA (US)

(72) Inventors: David T. Haggerty, San Francisco, CA (US); Jerrold Von Hauck, Windermere, FL (US); Ben-Heng Juang, Milpitas, CA (US); Li Li, Los Altos, CA (US); Arun G. Mathias, Sunnyvale, CA (US); Kevin McLaughlin, Mountain View, CA (US); Avinash Narasimhan, Cupertino, CA (US); Christopher Sharp, Sunnyvale, CA (US); Yousuf H. Vaid, Cupertino, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 13/767,593

(22) Filed: Feb. 14, 2013

(65) Prior Publication Data
US 2013/0227646 A1 Aug. 29, 2013

Related U.S. Application Data

(60) Provisional application No. 61/598,819, filed on Feb. 14, 2012.

(51) Int. Cl.
*G06F 7/04* (2006.01)
*H04W 12/06* (2009.01)
*H04L 29/06* (2006.01)

(52) U.S. Cl.
CPC .......... *H04W 12/06* (2013.01); *H04L 63/0853* (2013.01); *H04L 63/205* (2013.01)

(58) Field of Classification Search
USPC .............................................. 726/3; 713/156
See application file for complete search history.

(56) References Cited

U.S. PATENT DOCUMENTS

| 8,522,035 B2 * | 8/2013 | Sherkin et al. ................ 713/176 |
| 2004/0230965 A1 | 11/2004 | Okkonen |
| 2008/0037786 A1 | 2/2008 | Park |

(Continued)

FOREIGN PATENT DOCUMENTS

| EP | 2475217 | 7/2012 |
| KR | 20070093770 | 9/2007 |

(Continued)

OTHER PUBLICATIONS

PCT Application No. PCT/US2013/026194—International Search Report and Written Opinion dated Sep. 6, 2013.

(Continued)

*Primary Examiner* — Amare F Tabor
(74) *Attorney, Agent, or Firm* — Downey Brand LLP

(57) ABSTRACT

Methods and apparatus for large scale distribution of electronic access control clients. In one aspect, a tiered security software protocol is disclosed. In one exemplary embodiment, a server electronic Universal Integrated Circuit Card (eUICC) and client eUICC software comprise a so-called "stack" of software layers. Each software layer is responsible for a set of hierarchical functions which are negotiated with its corresponding peer software layer. The tiered security software protocol is configured for large scale distribution of electronic Subscriber Identity Modules (eSIMs).

20 Claims, 16 Drawing Sheets

(56) References Cited

U.S. PATENT DOCUMENTS

| | | | |
|---|---|---|---|
| 2009/0100262 A1 | 4/2009 | Yoo | |
| 2010/0082980 A1 | 4/2010 | Shiraki | |
| 2010/0153713 A1* | 6/2010 | Klein | 713/158 |
| 2010/0293543 A1 | 11/2010 | Erhart et al. | |
| 2010/0311468 A1 | 12/2010 | Shi et al. | |
| 2011/0145602 A1 | 6/2011 | Ginter et al. | |
| 2011/0173678 A1 | 7/2011 | Kaippallimalil et al. | |
| 2011/0314388 A1 | 12/2011 | Wheatley | |
| 2012/0297473 A1* | 11/2012 | Case et al. | 726/10 |
| 2013/0225146 A1 | 8/2013 | Qi et al. | |
| 2014/0237101 A1* | 8/2014 | Park | 709/223 |

FOREIGN PATENT DOCUMENTS

| | | |
|---|---|---|
| WO | 2008088923 | 7/2008 |
| WO | WO2010144479 | 12/2010 |

OTHER PUBLICATIONS

Taiwanese Patent Application No. 102105663—Office Action dated Aug. 12, 2014.

Korean Patent Application No. 10-2014-7025521—Office Action dated Aug. 11, 2015.

ETSI TC SCP, Liaison Statement on new Work Item for EUICC [online], 3GPP TSG-SA WG1#54 S1-111191 Internet URL: http://www.3gpp.org/ftp/tsg_sa/WG1_Serv/TSGS1_54_Xian/docs/S1-111191.zip.

Japanese Patent Application No. 2014-557779—Office Action dated Sep. 14, 2015.

* cited by examiner (TO FIGURE 10B)

METHODS AND APPARATUS FOR LARGE SCALE DISTRIBUTION OF ELECTRONIC ACCESS CLIENTS

PRIORITY AND RELATED APPLICATIONS

This application Claims priority to U.S. Provisional Patent Application Ser. No. 61/598,819 filed Feb. 14, 2012 and entitled "METHODS AND APPARATUS FOR LARGE SCALE DISTRIBUTION OF ELECTRONIC ACCESS CLIENTS", which is incorporated herein by reference in its entirety.

This application is related to co-owned U.S. Provisional Patent Application Ser. Nos. 61/479,319 filed on Apr. 26, 2011, and entitled "ELECTRONIC ACCESS CLIENT DISTRIBUTION APPARATUS AND METHODS", 61/483,582 filed on May 6, 2011, and entitled "METHODS AND APPARATUS FOR PROVIDING MANAGEMENT CAPABILITIES FOR ACCESS CONTROL CLIENTS", and co-owned, co-pending U.S. patent application Ser. No. 13/095,716 filed on Apr. 27, 2011, and entitled "APPARATUS AND METHODS FOR DISTRIBUTING AND STORING ELECTRONIC ACCESS CLIENTS", Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 13/183,023 filed on Jul. 14, 2011 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", Ser. No. 13/093,722 filed on Apr. 25, 2011, and entitled "APPARATUS AND METHODS FOR STORING ELECTRONIC ACCESS CLIENTS", Ser. No. 13/109,851 filed on May 17, 2011 and entitled "METHODS AND APPARATUS FOR ACCESS CONTROL CLIENT ASSISTED ROAMING", Ser. No. 13/079,614 filed on Apr. 4, 2011 and entitled "MANAGEMENT SYSTEMS FOR MULTIPLE ACCESS CONTROL ENTITIES", Ser. No. 13/111,801 filed on May 19, 2011 and entitled "METHODS AND APPARATUS FOR DELIVERING ELECTRONIC IDENTIFICATION COMPONENTS OVER A WIRELESS NETWORK", Ser. No. 13/080,521 filed on Apr. 5, 2011 and entitled "METHODS AND APPARATUS FOR STORAGE AND EXECUTION OF ACCESS CONTROL CLIENTS", Ser. No. 13/078,811 filed on Apr. 1, 2011 and entitled "ACCESS DATA PROVISIONING APPARATUS AND METHODS", Ser. No. 13/287,874 filed on Nov. 2, 2011 and entitled "METHODS AND APPARATUS FOR ACCESS DATA RECOVERY FROM A MALFUNCTIONING DEVICE", Ser. No. 13/080,533 filed on Apr. 5, 2011 and entitled "SIMULACRUM OF PHYSICAL SECURITY DEVICE AND METHODS", and Ser. No. 13/294,631 filed on Nov. 11, 2011 and entitled "APPARATUS AND METHODS FOR RECORDATION OF DEVICE HISTORY ACROSS MULTIPLE SOFTWARE EMULATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless communication and data networks. More particularly, the invention is directed to, inter alia, methods and apparatus for large scale distribution of electronic access control clients.

2. Description of Related Art

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC) (also referred to as a "SIM card"). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Prior SIM card based approaches suffer from a number of disabilities. For instance, traditional UICCs support only a single USIM (or more generally "SIM") access control client. If a user wants to authenticate to a cellular network using a different SIM, the user must physically exchange the SIM card in the device with a different SIM card. Some devices have been designed to house two SIM cards at the same time (Dual-SIM phones); however, such Dual-SIM phones do not address the fundamental physical limitations of SIM card devices. For example, information stored within one SIM card cannot be easily consolidated with information stored within another SIM card. Existing Dual-SIM devices cannot access the contents of both SIM cards simultaneously.

Moreover, accessing a SIM card requires a perceptible amount of time for the user; switching between SIM cards to transfer information is undesirable, and is present in both traditional and Dual-SIM devices.

Additionally, existing SIM card issuers and activation entities are generally network-specific, and not ubiquitous for different users in different networks. Specifically, a given user within a given network must activate their phone or obtain replacement SIM cards from a very specific entity authorized to issue the SIM. This can greatly restrict a user's ability to rapidly obtain a valid access privilege, such as when roaming across other networks, replacing their phone, etc.

More recently, electronic SIMs (so-called eSIMs) have been developed, such as by the Assignee hereof. These electronic SIMs provide enhanced flexibility in terms of changeout with another eSIM, transfer to another device, etc. However, existing network infrastructure for distribution and activation of SIMs has not kept pace with these advances, and hence Accordingly, new solutions and infrastructure are needed to leverage the enhanced flexibility provided by electronic access clients (e.g., eSIMs), and to support secure and ubiquitous distribution thereof.

SUMMARY

The present disclosure provides, inter alia, for large scale distribution of electronic access control clients.

Firstly, a method for large scale distribution of electronic access control clients is disclosed. In one exemplary embodiment, the method includes: establishing ownership of one or more electronic access control clients; determining if one or more electronic access control clients have not been previously duplicated; encrypting the one or more electronic access control clients for transfer to a second device; and exchanging the encrypted one or more electronic access control clients.

An apparatus for large scale distribution of electronic access control clients is also disclosed. In one exemplary embodiment, the apparatus includes: a processor; and a non-transitory computer-readable medium that includes instructions which when executed by the processor: establish ownership of one or more electronic access control clients; determine if one or more electronic access control clients have not been previously duplicated; encrypt the one or more electronic access control clients for transfer to a second device; and exchange the encrypted one or more electronic access control clients.

A mobile device for transacting an electronic access control client is further disclosed. In one embodiment, the device includes: a wireless interface configured to communicate with a wireless network; a processor in data communication with the interface; and a secure element in data communication with the interface. In one variant, the secure element includes: a secure processor; secure storage in data communication with the secure processor and having a plurality of access control clients useful for authentication with at least the network stored thereon; and logic in data communication with the secure processor, the logic configured to store, access, and transfer to or from the apparatus the plurality of access control clients; and user interface logic in communication with at least the secure element and configured to enable a user of the apparatus to select one of the stored plurality access control clients, and authenticate the apparatus to the network so as to enable communication therewith.

A wireless system is also disclosed.

Additionally, a computer readable apparatus is disclosed. In one embodiment, the apparatus includes a storage medium having a computer program disposed thereon, the program configured to, when executed: distribute electronic access control clients.

Additionally, a network architecture for providing wireless mobile devices with electronic access clients is disclosed. In one embodiment, the architecture includes: a plurality of brokers; and a plurality of manufacturers in data communication with the plurality of brokers. In one variant, a given user mobile device may be serviced by multiple ones of the brokers; and any one of the brokers may order electronic access clients from one or more of the manufacturers.

Apparatus for providing electronic access clients to one or more mobile devices, is also disclosed. In one embodiment, the apparatus includes: at least one processor; and first logic in data communication with the at least one processor, the first logic configured to cause the apparatus to perform encryption and decryption of an access client; second logic in data communication with the at least one processor, the second logic configured to cause the apparatus to ensure that the access client is not duplicated; and third logic in data communication with the at least one processor, the third logic configured to cause the apparatus to establish at least one of trust, ownership, and/or verification of a user of the access client.

An electronic access control client revocation procedure is further disclosed. In one embodiment, the procedure includes: determining if a signing certificate authority that issued a certificate is compromised, the certificate associated with one or more devices storing the certificate; determining at the one or more devices a certificate service request created when an initial request for the certificate was created; requesting a new certificate using the determined certificate service request; and issuing a new certificate based on the requesting. In one variant, the one or more devices can use a previous used private key as part of the requesting, and the new certificate is issued containing a previous public key corresponding to the previous private key.

Other features and advantages will immediately be recognized by persons of ordinary skill in the art with reference to the attached drawings and detailed description of exemplary embodiments as given below.

Figure 1:
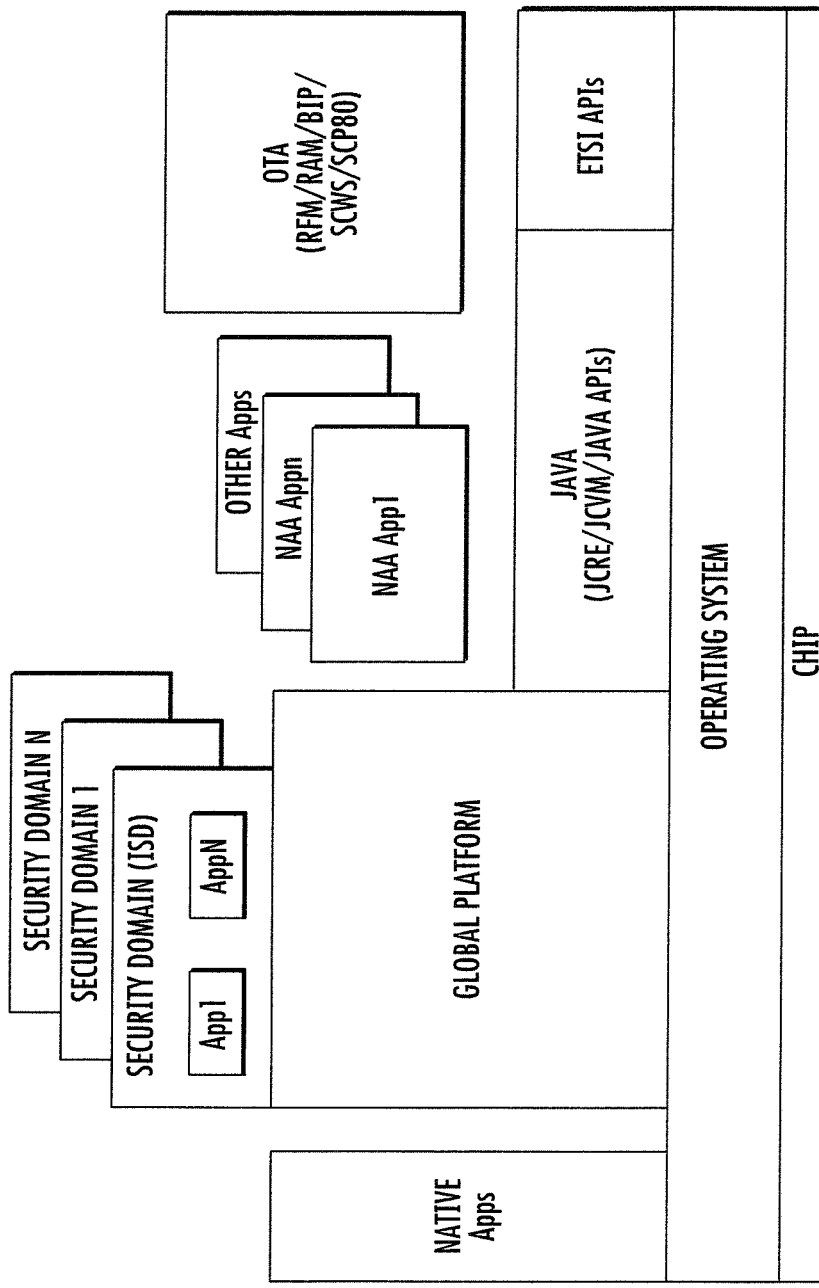
FIG. 1 is a logical block diagram of one exemplary electronic Universal Integrated Circuit Card (eUICC) useful in conjunction with various aspects of the present disclosure.

All Figures Copyright 2012 Apple Inc. All rights reserved.

DETAILED DESCRIPTION

Reference is now made to the drawings, wherein like numerals refer to like parts throughout.

Description of Exemplary Embodiments

Exemplary embodiments and aspects of the present disclosure are now described in detail. While these embodiments and aspects are primarily discussed in the context of Subscriber Identity Modules (SIMs) of a GSM, GPRS/EDGE, or UMTS cellular network, it will be recognized by those of ordinary skill that the present disclosure is not so limited. In fact, the various features of the disclosure are useful in any network (whether wireless cellular or otherwise) that can benefit from storing and distributing access control clients to devices.

As used herein, the terms "client" and "UE" include, but are not limited to wireless-enabled cellular telephones, smartphones (such as for example an iPhonirm), wireless enabled personal computers (PCs), mobile devices such as handheld computers, PDAs, personal media devices (PMDs), wireless tablets (such as for example an iPad™), so-called "phablets", or any combinations of the foregoing.

As used hereinafter, the term "Subscriber Identity Module (SIM)", "electronic SIM (eSIM)", "profile", and "access control client" refer generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc., or any combinations of the foregoing. It will also be recognized that while the term "subscriber identity module" is used herein (e.g., eSIM), this term in no way necessarily connotes or requires either (i) use by a subscriber per se (i.e., the various features of the disclosure may be practiced by a subscriber or non-subscriber); (ii) identity of a single individual (i.e., the various features of the disclosure may be practiced on behalf of a group of individuals such as a family, or intangible or fictitious entity such as an enterprise); or (iii) any tangible "module" equipment or hardware.

Exemplary eUICC and eSIM Operation—

Various features and functions of the present disclosure are now discussed with respect to one exemplary implementation. In the context of the exemplary embodiment of the present disclosure, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple SIM elements, referred hereafter as Electronic Subscriber Identity Modules (eSIM). Each eSIM is a software emulation of a typical USIM, and contains analogous programming and user data associated therewith. The eUICC selects an eSIM based upon the eSIM's ICC-ID. Once the eUICC selects the desired eSIM(s), the UE can initiate an authentication procedure to obtain wireless network services from the eSIM's corresponding network operator.

eUICC Software Architecture—

Referring now to FIG. 1 one exemplary electronic Universal Integrated Circuit Card (eUICC) useful in conjunction with the present disclosure is shown. Examples of an exemplary eUICC are described within co-owned, co-pending U.S. patent application Ser. No. 13/093,722 filed on Apr. 25, 2011, and entitled "APPARATUS AND METHODS FOR STORING ELECTRONIC ACCESS CLIENTS", previously incorporated by reference in its entirety, although it will be appreciated that other may be used consistent with the present disclosure.

FIG. 1 illustrates one exemplary Java Card™ eUICC architecture. Other examples of Operating Systems (OS) for use on smart card applications include (without limitation) MULTOS and proprietary OSs, Java Card being merely illustrative. The OS provides an interface between application software and hardware. Generally, the OS includes services and functionality configured for: Input Output (I/O), Random Access Memory (RAM), Read Only Memory (ROM), non-volatile memory (NV) (EEPROM, flash), etc. The OS may also provide cryptographic services used by higher layers, memory and file management, and communication protocols.

The exemplary Java implementation is composed of three pieces: a Java Card Virtual Machine (JCVM) (a byte code interpreter); Java Card run time environment (JCRE) (which manages card resources, applet execution and other runtime features); and Java Application Programming Interfaces (APIs) (a set of customized classes for programming smart card applications).

The JCVM has an on-card component (the byte code interpreter), and an off-card counterpart (the converter). Some compilation tasks may be performed by the converter due to card resource restrictions. Initially, the Java compiler creates class files from source code. The converter preprocesses the class files and creates a CAP file. The converter verifies that the load images of the java classes are well formed, checks for Java card language subset violations, and also performs some other tasks. A CAP file contains an executable binary representation of the classes in a Java package. The converter also generates export files, which contain public API information. Only the CAP file is loaded into the card. Another commonly used format is IJC, which can be converted from CAP files. IJC files may be slightly smaller in size compared to CAP files.

Typically, downloading an applet to a card requires an Application Protocol Data Unit (APDU) exchange to load the content of the CAP file into the persistent memory of the card. The on card installer would also link the classes in the CAP file with other classes on the card. Thereafter the installation process creates an instance of the applet and registers the instance with the JCRE. Applets are held in a suspended state until selected.

The foregoing procedure may additionally implement one or more layers of security. In one exemplary embodiment, a Global Platform (GP) provides a secure protocol to manage applications. The GP operates within a secure issuer security domain, which is an on-card representation of the card issuer. The card may also execute other security domains for e.g., application providers.

In one exemplary embodiment, the eUICC is a non-removable component of a device. During operation, the eUICC executes a secure bootstrap OS. The bootstrap OS ensures that the eUICC is secure, and manages execution of the security protocols therein. Examples of a secure bootstrap OS are described within co-owned, co-pending U.S. patent application Ser. No. 13/080,521 filed on Apr. 5, 2011 and entitled "METHODS AND APPARATUS FOR STORAGE AND EXECUTION OF ACCESS CONTROL CLIENTS", previously incorporated by reference in its entirety. It is further appreciated that different Mobile Network Operators (MNOs) may customize eSIMs to support various degrees of service differentiation. Common examples of customization include, without limitation, proprietary file structures and/or software applications. Due to the configurability of eSIMs, eSIMs can vary significantly in size.

Unlike prior art SIM cards, eSIMs can be freely exchanged between devices according to a secure transaction. Subscribers do not require a "physical card" to move SIMs among devices; however, the actual transaction of eSIMs must be securely protected e.g., via specific security protocols. In one exemplary embodiment, an eSIM is encrypted for a specific receiver before being delivered. In some variants, in addition to the encrypted content, each eSIM may include a meta-data section that is plaintext. A cryptographic signature may further be used to ensure integrity of the plain text content. This meta-data section may be freely provided (even to unsecure entities), to assist in non-secure storage, etc.

eSIM Software Architecture—

Figure 2:
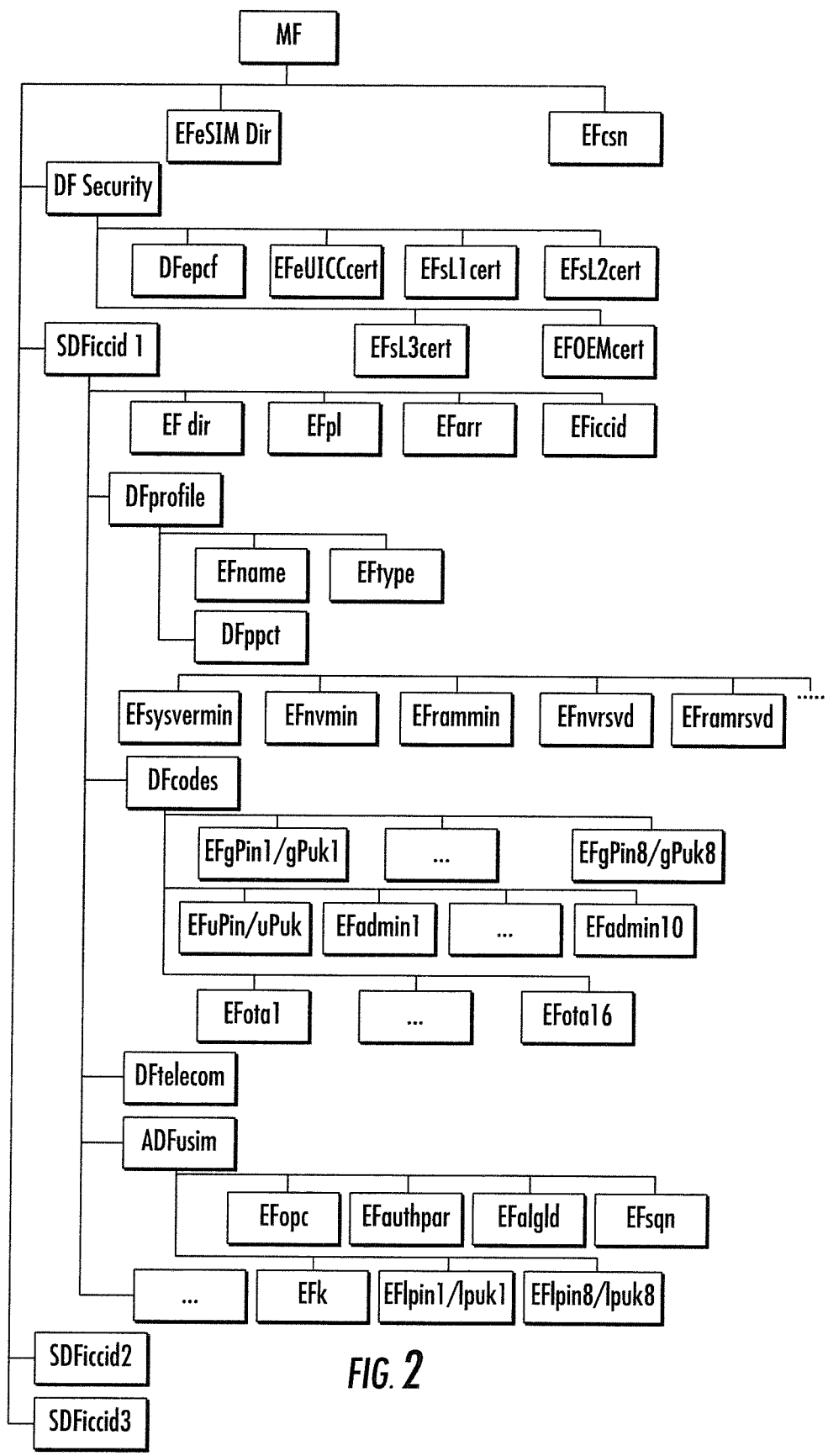
FIG. 2 is a logical block diagram of one exemplary electronic Subscriber Identity Module (eSIM) directory structure useful in conjunction with various aspects of the present disclosure.

Referring now to FIG. 2, one exemplary electronic Subscriber Identity Module (eSIM) directory structure, embodied within the exemplary eUICC, is disclosed. As shown, the eSIM directory structure has been modified to support the flexibility offered by eSIMs. For example, the eSIM directory structure include inter glia: (i) EFeSimDir which contains a list of eSIMs installed; (ii) EFcsn which contains the card serial number that globally uniquely identifies the eUICC; (iii) DFsecurity stores security related data and the private key corresponding to one or more eUICC certificates. In one such variant, the DFsecurity information includes: (i) DFepcf which contains eUICC platform level PCF; (ii) EFoemcert which contains the root certificate and common name of the OEM (OEM credential can be used for special operations such as factory refurbishment); (iii) EfeUICCcert which is the certificate of the eUICC; (iv) EFsL1cert which is the root certificate of server L1 appliances; (v) EFsL2cert which is the root certificate of server L2 appliances; and (vi) EFsL3cert which is the root certificate of server L3 appliances.

In one exemplary embodiment, the directory structure further includes SIM Dedicated Files (SDF) which contain file structures that are specific to an eSIM. Each SDF is located directly under the MF. Each SDF has a name attribute and a SID (eSIM ID), such as the Integrated Circuit Card Identifier (ICCID). As shown, each SDF further contains DFprofiles and DFcodes. Furthermore, in one variant, all profile PCF related EFs are stored under DFppef, which is stored under DFprofile.

In one exemplary embodiment, DFprofile information includes: (i) EFname which is a description of the eSIM (such as name and version of the eSIM); (ii) EFtype which describes the type of the eSIM (e.g., regular, bootstrap, and test). Software applications may use this information to e.g., display an icon when a bootstrap eSIM is in use; (iii) EFsys_ver which is the minimum version number of the eUICC software to necessary to support the eSIM; (iv) EFnv_min which indicates the minimum amount of non volatile memory required by the eSIM; (v) EFram_min which indicates the minimum amount of volatile memory required; (vi) EFn-v_rsvd which indicates the amount of non volatile memory reserved for over the air transactions (OTA); and (vii) EFram_rsvd which indicates the amount of volatile memory reserved for OTA.

In one exemplary embodiment, DFcode information contains a set of keys for each eSIM. These values cannot be read out of eUICC under most circumstances. One exceptional use case is the export operation which cryptographically wraps and exports the entire eSIM. Since the entire eSIM is encrypted, the values of keys remain secured. In one exemplary embodiment, the DFcode information comprises: (i) ExEFgPinx/gPukx which contains a global PIN (Personal Identification Number) and PUK (PIN Unlock Key); (ii) EFuPin/uPuk contains the universal PIN and PUK; (iii) EFadminx contains ADMIN codes; and (iv) EFotax which contains OTA codes. In some variants, there may also be an ADFusim which contains additional elements such as: (i) EFk which stores K, the 128-bit shared authentication key; (ii) EFopc which stores OPc, which is derived from the subscriber key and operator variant algorithm configuration field OP (some variants may store OP instead of ON); (iii) EFauthpar which specifies the length of RES; (iv) EFalgid which specifies the network authentication algorithm (for example, Milenage); (v) EFsqn which stores SQN; and (vi) EFlpinx/lpukx which stores the PIN and PUK code for the local PIN.

It will be appreciated by those of ordinary skill reading this disclosure that the foregoing files, structures, or elements are merely exemplary, and may be substituted with others possessing the desired functionality or structure.

Figure 3:
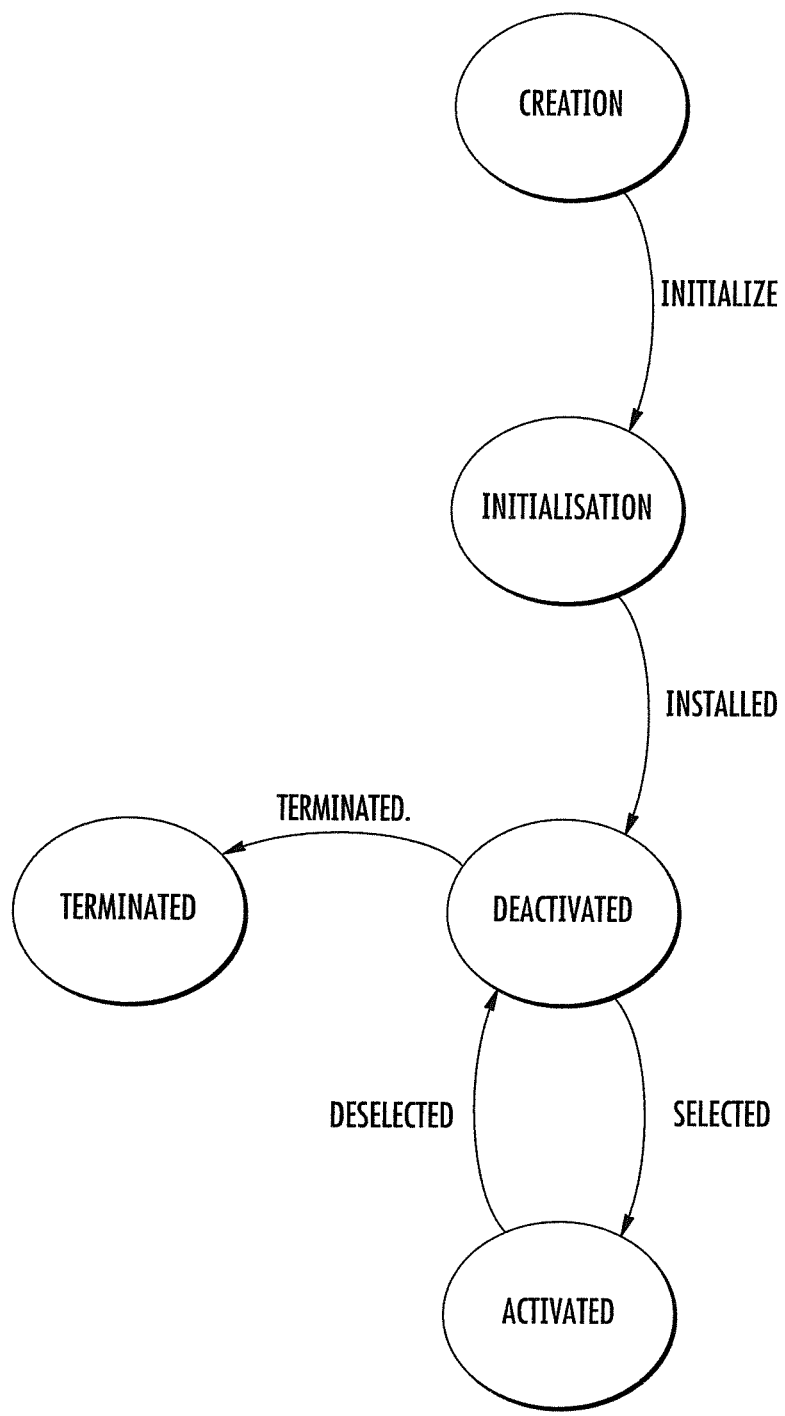
FIG. 3 is a logical block diagram representing one exemplary state machine for Subscriber Identity Module (SIM) Dedicated Files (SDF) useful in conjunction with various aspects of the present disclosure.

Referring now to FIG. 3, one exemplary state machine for SDF operation is illustrated. As shown, the SDF state machine comprises the following states: CREATION, INITIALISATION, OPERATIONAL (ACTIVATED), OPERATIONAL (DEACTIVATED), and TERMINATION.

When an eSIM is first installed, the SDF is created (CREATION) and then initialized (INITIALISATION) with the file structure data included in the eSIM. Once the eSIM has been installed, the SDF transitions to the DEACTIVATED state. During the deactivated state, none of the files are available. Once an eSIM is selected, the SDF transitions from the DEACTIVATED state to the ACTIVATED state; the ACTIVATED state enables access to the files of the SDF. When an eSIM is deselected (either implicitly or explicitly) the SDF transitions from the ACTIVATED state back to the DEACTIVATED state.

Figure 4:
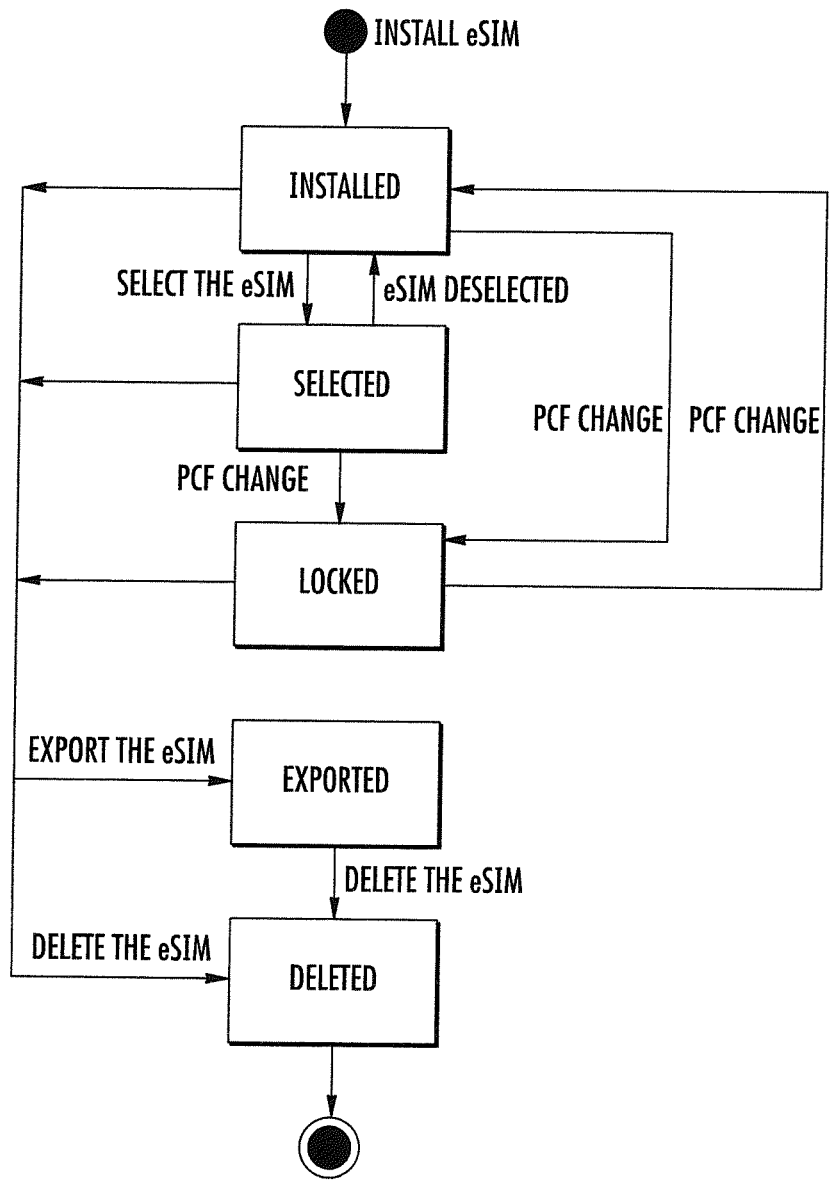
FIG. 4 is a logical block diagram representing one exemplary state machine for eSIM operation useful in conjunction with various aspects of the present disclosure.

Referring now to FIG. 4 one exemplary state machine for eSIM operation is illustrated. As shown, the eSIM state machine comprises the following states: INSTALLED, SELECTED, LOCKED, DEACTIVATED, EXPORTED, and DELETED.

During eSIM installation (INSTALLED), an entry for the eSIM is created in the eUICC registry; the entry indicates one or more associated SDF and applications. During the INSTALLED state, the SDF are set to the DEACTIVATED state and applications are set to an INSTALLED state.

Once the eSIM is selected, the eSIM transitions to the SELECTED state. During the selected state, the SDFs transition to the ACTIVATED state and the applications are transitioned to a SELECTABLE state. If an eSIM is deselected, the eSIM transitions back to the INSTALLED state.

Under certain circumstances, the eSIM may enter a LOCKED state. For example, if the eUICC PCF is changed such that an installed eSIM may no longer be used, then the eSIM will transition to the LOCKED state. In the LOCKED state, the SDF are set to the DEACTIVATED state and applications are set to the LOCKED state. Other miscellaneous states include, the EXPORTED state (i.e., where the eSIM is exported and may no longer be selected), and the DELETED state (i.e., where the eSIM is deleted).

Network Authentication Algorithms—

Network Authentication Algorithms (NAA) are generally mandatory for operation with Mobile Network Operators (MNOs). While different implementations of NAA exist, the functionality is not substantially different. In certain embodiments, the eUICC may include common packages for NAAs. During eSIM installation, an instance of each NAA app can be created for each eSIM from the pre-loaded packages, to reduce overall loading time of eSIM, and unnecessary memory consumption on eUICC.

Common examples of NAA include without limitation: Milenage, COMP128 V1, COMP128 V2, COMP128 V3, and COMP128 V4, and certain proprietary algorithms. There are a larger number of proprietary algorithms still in use (due to known attacks on COMP128 V1). In one embodiment, network authentication is based on the well known Authentication and Key Agreement (AKA) protocol.

In the unlikely event that a NAA is compromised, replacement NAA schemes may require a software update. During such an event, eSIMs may be patched with a replacement algorithm via e.g., a secure software update. Thereafter, the MNO may enable the replacement algorithm via an existing OTA mechanism.

Exemplary eSIM Broker Network—

Figure 5:
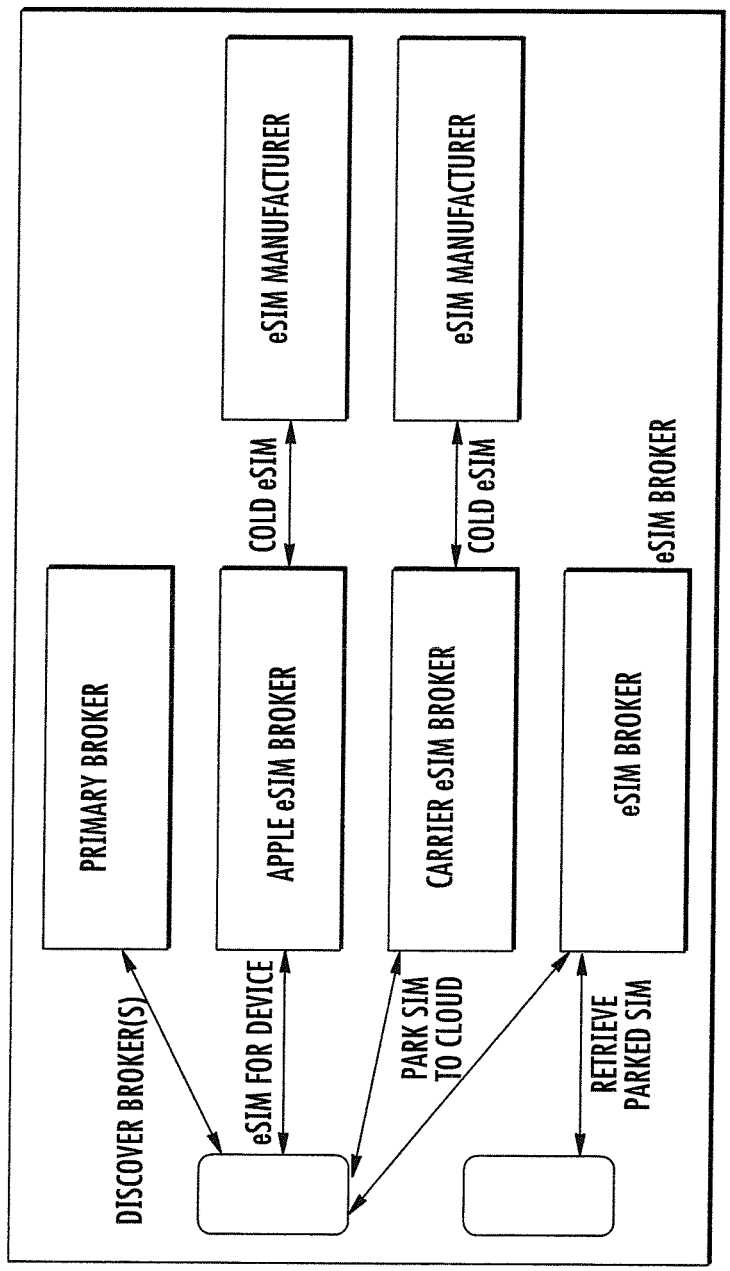
FIG. 5 is a graphical representation of one exemplary eSIM broker network useful with various embodiments of the present disclosure.

FIG. 5 shows a high level view of one exemplary eSIM broker network useful with various embodiments of the present disclosure. In one exemplary embodiment, the broker network comprises a distributed network of brokers and manufacturers, such that a device may be serviced by multiple brokers, and a broker may order eSIMs from multiple eSIM manufacturers. In some embodiments, there may exist eUICC and/or eSIM profile policies that limit the group of brokers that a device may communicate with for certain eSIM operations. For example, a MNO may require devices that are subsidized by the MNO only communicates with brokers owned by the MNO.

In one such variant, the primary broker provides discovery services to devices, such that the device can identify an appropriate broker. Thereafter, the device can communicate directly with the identified broker for eSIM operations (e.g., such as purchase, installation, export, and import).

Those of ordinary skill in the related network arts will recognize that multiple practical issues arise during the operation of large scale distribution networks, such as that represented by FIG. 5. Specifically, large scale distribution networks must be scalable to handle large bursts of provisioning traffic (such as can occur on a so-called "launch day" of a given mobile user device). One suggested scheme for reducing overall network traffic entails pre-personalizing eSIMs (where possible) prior to launch day. For example so-called "SIM-in" units are already assigned an eSIM at shipment; this pre-assigned eSIM can be pre-personalized for the unit by, for example, encrypting the corresponding eSIM profile with a key specific to the eUICC of the unit.

Other considerations include system reliability, for example, the broker network must be able to recover from various equipment failures. One solution is geographic redundancy where multiple data centers across different locations have duplicate content; however, the network of data centers may actively synchronize with each other to avoid eSIM cloning. Such network synchronization would require extraordinary amounts of network bandwidth. In alternate solutions, each data center may have a separate set of eSIMs; however this requires an significant eSIM overhead.

Ideally, the brokering network can flexibly adapt to various business models. Specifically, for various legal and antitrust reasons, various components of the foregoing broker network may be handled by different parties. Accordingly, security aspects of eSIM traffic needs to be carefully monitored and evaluated. Each eSIM contains valuable user and MNO information. For example, an eSIM may include the shared authentication key (K for USIM and Ki for SIM), which if compromised could be used for SIM cloning. Similarly, eSIMs may also contain applications that may have sensitive user data such as bank account information.

Moreover, it is further appreciated that eUICC software requires further countermeasures for device recovery. Unlike physical SIMs, if the eUICC software goes into an unrecoverable state, the entire device will need to be replaced (which is much more costly than changing a SIM card). Accordingly, exemplary solutions should be able to handle device recovery so as to preclude such draconian measures.

Finally, the network operation should provide for a "good" user experience. Excessive response times, unreliable operation, excessive software crashes, etc. can significantly detract from the overall user experience.

Exemplary Security Protocol—

Accordingly, a tiered security software protocol is disclosed herein to address various of the foregoing issues. In one exemplary embodiment, the server eUICC and client eUICC software comprise a so-called "stack" of software layers. Each software layer is responsible for a set of hierarchical functions which are negotiated with its corresponding peer software layer. Moreover, each software layer further communicates with its own layers. It is further appreciated that in some cases, the device application processor (AP) may be compromised (e.g., "jailbroken", etc.); consequently, it is recognized that trust relationships exist between the client eUICC and corresponding server eUICC (or other secure entity); i.e., the AP is not trusted.

Figure 6:
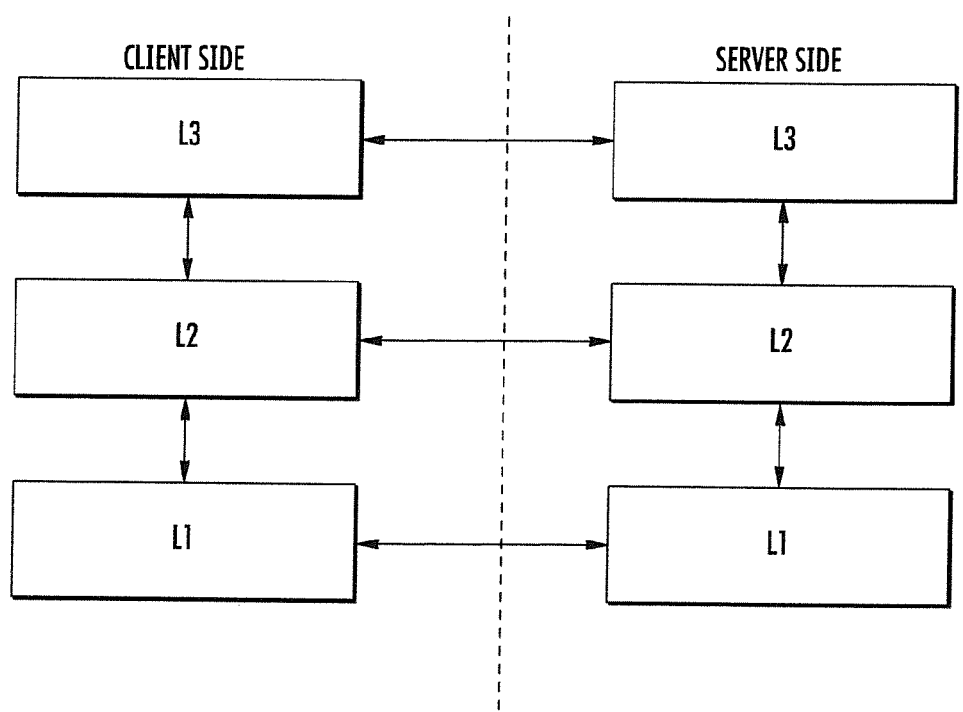
FIG. 6 is a logical block diagram of one exemplary tiered security protocol useful with various embodiments of the present disclosure.

In one exemplary embodiment, a three (3) tiered system is disclosed. As illustrated in FIG. 6, the security software protocol comprises a Level 1 (L1), Level 2 (L2), and Level 3 (L3). L1 security performs encryption and decryption of eSIM Data. L1 operations are limited to secure execution environments (e.g., an eUICC or Hardware Security Module (HSM)). Within L1, eSIM data can be stored in plain text (i.e., unencrypted) within the logical L1 boundary; outside of the L1 boundary the eSIM data is always securely encrypted. L2 security ensures that an eSIM cannot be duplicated. The L2 boundary ensures that one and only one copy of an eSIM exists. Within the L2 boundary multiple copies may exist. Moreover, L2 security may further embed a challenge into the encrypted eSIM payload; a recipient of the eSIM will compare the received challenge to the challenge stored earlier before installing the eSIM to ensure that its eSIM is not stale (i.e., is the current one and only eSIM). L3 security is responsible for establishing trust, ownership, and verification of the user. For each eSIM, the eUICC may store information to indicate ownership associated with the eSIM.

In one exemplary implementation, so-called "challenges" are a critical resource used to associate a specific eSIM instance with an eUICC. Specifically, each eUICC maintains a certain number of challenges for each profile agent, which is the logical entity that maintains L2 security. By verifying that a challenge is valid, the eUICC can be sure that the eSIM is not a stale eSIM (i.e., an invalid duplicate). A number of challenges are created for each eSIM to be personalized. The eUICC deletes a challenge when a matching eSIM is received.

Consider the following pre-personalization scenario, an eUICC creates (or is given) a number of challenges which is provided to the network; the challenges are also saved in non volatile memory of the eUICC. Subsequently thereafter, the network can generate an eSIM for the eUICC which is bound to the pre-generated challenge. When the eUICC receives an eSIM later during device activation, the eUICC can verify that the received eSIM contains the appropriate challenge.

However, one drawback of the foregoing scheme is that a fixed number of challenges can be easily compromised with a denial of service (DOS) attack. In a DOS attack, the eUICC is continuously triggered to generate challenges until all of its challenge resources are exhausted. Accordingly, in one such variant, the eUICC additionally performs a session handshake to authenticate a profile server/agent before processing requests that would trigger eUICC to create a challenge. Additionally, in the unlikely case that resources are exhausted and eUICC is unable to create new challenges, the eUICC may store a separate set of reserved challenges specifically designated for freeing up another set of challenges. In some cases, the eUICC may additionally include an Original Equipment Manufacturer (OEM) credential, which the OEM can use to further control challenge operation.

Figure 7:
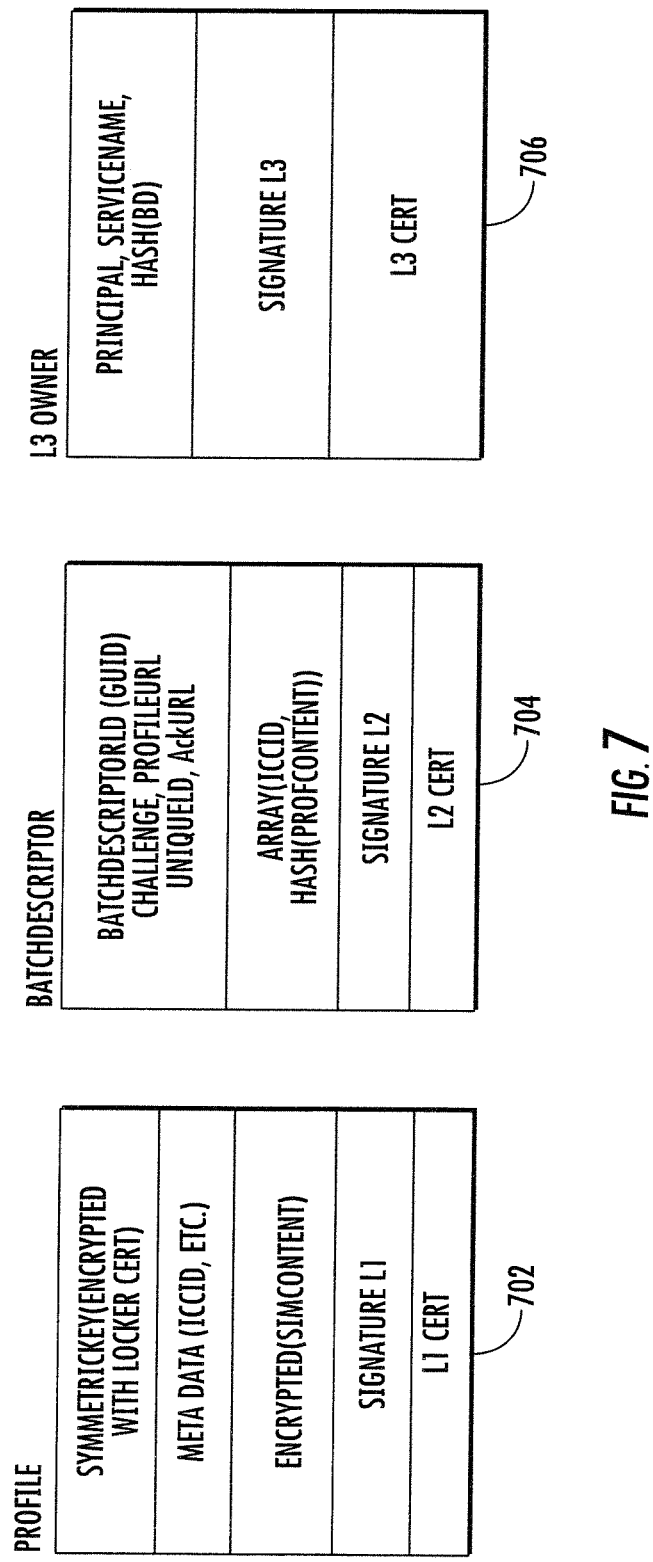
FIG. 7 is a graphical representation of one exemplary data structure comprising three (3) pieces, useful in conjunction with various aspects of the present disclosure.

Referring now to FIG. 7, one exemplary data structure for an eSIM is illustrated. As shown, the exemplary data structure comprises three (3) pieces, one for each of the L1, L2, and L3 security levels. By decoupling security components into distinct levels, overall network operation can be distributed over multiple entities according to a wide variety of options. For example, various network entities may perform only one or two of the security layers (e.g., a eSIM vendor may only handle L2, etc.); this flexibility easily and advantageously accommodates virtually any business arrangement.

As shown in FIG. 7, because asymmetric encryption (i.e., where each entity has a distinct and unique key) is much slower than symmetric operation (where entities share a key), each eSIM profile component 702 is encrypted with a symmetric key, and the symmetric key is encrypted with the L1 public key of the destined eSIM receiver. The eSIM may further includes a plain text section for metadata (such as a text string of the ICCID). The encrypted symmetric key, meta data, and encrypted eSIM content is hashed and signed with the public key of the "donating" L1 entity. The associated L1 certificate is appended, e.g., at the end, for verification.

The batch descriptor component 704 of FIG. 7 contains L2 information for the eSIM. It has a plain text section including a Globally Unique Identifier (GUID), a challenge for the destined eSIM receiver, a unique ID of the eSIM receiver, a URL to retrieve the profile, and the URL to post an installation result to. The batch descriptor also includes a plain text section of an array of elements that consist of: an ICCID for each profile, and a hashed portion of the profile (the metadata section and the encrypted eSIM content). In one embodiment, the hash does not include the symmetric key, such that a batch descriptor can be created without waiting for an actual profile to be generated. For device side operation, a batch descriptor only contains one ICCID and profile hash. For server to server batching transfer, a much larger array is expected. The data content of the batch descriptor is hashed and signed with a L2 public key, and an associated L2 certificate is appended at the end.

The L3 owner component 706 contains L3 information for the eSIM. The principal field identifies the user account associated with the eSIM (e.g., abc@me.com), the service name identifies the service provider to authenticate the user account with. The hash of batch descriptor is included to associate the L2 and L3 data structures. The data may be stored in plain text, hashed and signed with L3 public key. The L3 certificate is appended at the end.

As used herein, there are three (3) types of certificates: eUICC certificates, server appliance certificates, and OEM certificates. In one embodiment, a trusted third party issues certificates for certified eUICCs. Each eUICC contains a private key and an associated certificate, issued by this entity or a subordinate key authority of this entity. In some embodiments, one trusted third party may issue certificates for certified L1, L2, and L3 appliances; or alternately, separate third party entities may issue certificates for L1, L2, or L3 appliances. Where multiple third parties exist, the eUICC has preloaded (or may be provided OTA from a trusted entity) the root Certificate Authority (CA) of the third parties, and can verify messages received from the server appliances based on the appropriate CA.

Figure 8:
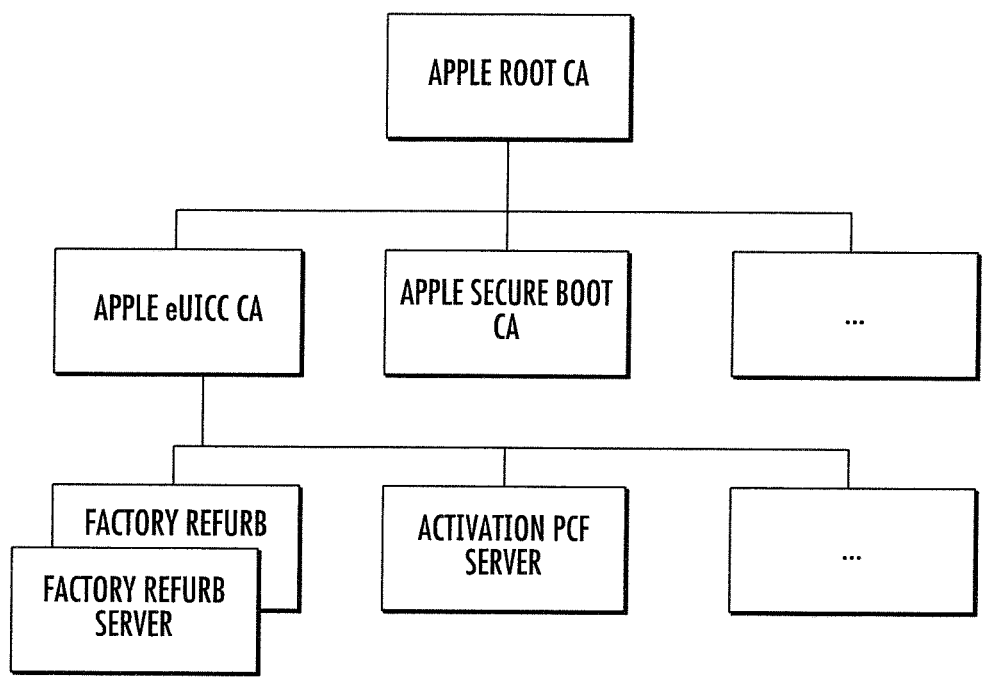
FIG. 8 is a graphical representation of one exemplary OEM certificate hierarchy, useful in conjunction with various aspects of the present disclosure.

Referring now to FIG. 8, one exemplary OEM certificate hierarchy is illustrated. The Root Certificate Authority (CA) has a set of intermediate CAs that perform a subset of tasks (e.g., issuing e.g., iOS or comparable device certificates). As shown, an eUICC CA is charged with eSIM specific operations. The eUICC CA may issue certificates for a set of servers; as shown the certificates include e.g., factory refurbishing servers for eUICC maintenance, and activation servers for signing eUICC PCF. The Root CA together with the common name of the eUICC CA are used by the client eUICC to verify the OEM signed messages.

In accordance with the foregoing, in one exemplary embodiment, each client eUICC stores the following security related data: (i) eUICC certificate that is used for eUICC L1, L2, and L3 operations (each eUICC stores a certificate that is used for both L1, L2, and L3 security related operations); (ii) an eUICC private key that is associated with the eUICC certificate; (iii) OEM credentials that include the root certificate of OEMs and the common name of the OEM eUICC CA; (iv) and root certificates of third parties that can certify server appliances. In some variants, certificates in the eUICC may need to be replaced if a signing CA is compromised; for example, if an eUICC CA or server CA is compromised (e.g., a private key has been compromised/lost), two (2) revocation procedures are described below.

According to a first exemplary revocation procedure, if a signing CA that issues eUICC certificates is compromised, the eUICC certificate stored in affected eUICCs should be replaced. Specifically, when the initial certificate request was created for the eUICC, the Certificate Signing Request (CSR) was saved. If the signing CA is compromised, a new certificate can be requested for the eUICC, using the initial CSR. By keeping the same CSR, the eUICC can use the same private key, and a new certificate will be issued containing the same eUICC public key. The OEM can sign the new certificate with the OEM's private key. When the eUICC sends requests to a server broker, the broker can check a revocation list of bad eUICC CAs and reject the request with a specific error to indicate that the certificate needs to be replaced. The AP can retrieve the new eUICC certificate via existing OEM services and send the new certificate to eUICC (the AP does not have to be trusted in this scenario).

Thereafter, the eUICC verifies the OEM signature and ensures that the received public key matches its previously stored public key in the eUICC. In some variants, in order to prevent denial of service (DOS) attacks or replay attacks, the eUICC additionally includes eUICC certificates. The epoch is in one variant increased when a new certificate is issued. The eUICC can verify that the eUICC epoch in the received certificate is higher than that of the current certificate, before storing the new certificate.

Unfortunately, revoking server certificates in eUICC can be challenging due to various eUICC resource constraints; i.e., processing a large revocation list may be untenable for an eUICC. To avoid maintaining revocation lists, in a second revocation scheme, each server certificate is additionally associated with an epoch. If a CA is compromised, the root CA reissues certificates for all legitimate entities, and increases the epoch of each new certificate. Since the number of server certificates will not be large, reissuing certificates can be handled in existing systems. At the client eUICC, the eUICC saves the expected epoch of server L1, L2, and L3 certificates in non-volatile memory. When a received certificate contains a higher epoch, eUICC must update the corresponding NV epoch and reject any future certificates with a lower epoch; i.e., the eUICC will reject rogue servers that have not been signed since the CA was compromised. In some variants, the server may also maintain an eUICC blacklist for compromised eUICCs. Requests from blacklisted eUICC are in one embodiment rejected by the server.

Policy Control Functions—

Within the context of the foregoing security solution, there are two (2) levels of Policy Control Functions (PCF): (i) eUICC platform level, and (ii) profile level. In one exemplary embodiment, the eUICC PCF may only be updated by OEM, whereas the Profile PCF is controlled by MNOs and is a part of the eSIM. In one such variant, when an eSIM is exported and/or imported, the profile PCF is included as a part of the export/import package.

Referring now to the eUICC PCF, the eUICC PCF may include: (i) a SIM lock policy that specifies the types of eSIMs that the eUICC may activate; (ii) a secret code that can be used to authorize deletion of all eSIMs in an eUICC; (iii) a list of common names of server (L1, L2, and L3) that specify a cluster of server appliances that the eUICC may communicate with (e.g., based on business considerations or methods) (i.e., an inclusive listing); (iv) a list of common names of server (L1, L2, and L3) that specify a cluster of server appliances that the eUICC may not communicate with (i.e., an exclusive listing).

Similarly, the profile PCF may include: (i) a list of common names of servers (L1, L2, and L3) that specify a cluster of depots that the eUICC may export the eSIM to (inclusive); (ii) a list of common names of servers (L1, L2, and L3) that specify a cluster of depots that the eUICC may NOT export the eSIM to (exclusive); (iii) notification URLs and operation types which specify URLs that are sent notifications upon completion of a specified eSIM operation; (iv) auto-expiration parameters where the AP may delete the eSIM once profile has expired; (v) classes of server appliances (L1, L2, and L3) that may be assigned different classes indicating the security levels implemented (a profile may choose to only communicate with server components above certain levels); (vi) an epoch of server certificates (L1, L2 and L3) which are checked during installation (e.g., the eUICC only installs profiles if the epoch of eUICC server certificates are equal to or above the specified epoch); (vii) L3 service names that L3 authentication may use, and/or a list of service names that L3 authentication cannot use; (viii) a minimum version of eUICC system (where the eSIM may only be installed on eUICC systems above the specified the minimum version); (ix) a minimum RAM size required for the eSIM (not including OTA operations); (x) a minimum RAM size reserved for OTA; (xi) a minimum non-volatile (NV) a memory size required for the eSIM (excluding the space served for OTA); (xii) a minimum NV size reserved for OTA Example Operation—

Within the context of the foregoing components (e.g., eUICC, eSIM, Broker Network, Security Protocol, etc.), the following exemplary messaging sequences are disclosed. In the sequence diagrams hereinafter, three entities are presented: a broker, a profile agent, and a profile locker, to represent the entities that are responsible for L3, L2, L1 securities respectively. However, it is appreciated that these are logical entities and different network topologies may be subsume or further differentiate the foregoing functions thereof, The client eUICC is in the illustrated embodiment responsible for all three levels of securities; however, for clarity, the client eUICC is separated into three logical entities to capture functional requirements within the eUICC. Moreover, while there may be separate sets of credentials for L1, L2, and L3 within the client eUICC, it is appreciated that the same (i.e., one credential) may be used since the client device is a single device.

eSIM Delivery, No Personalization—

Figure 9:
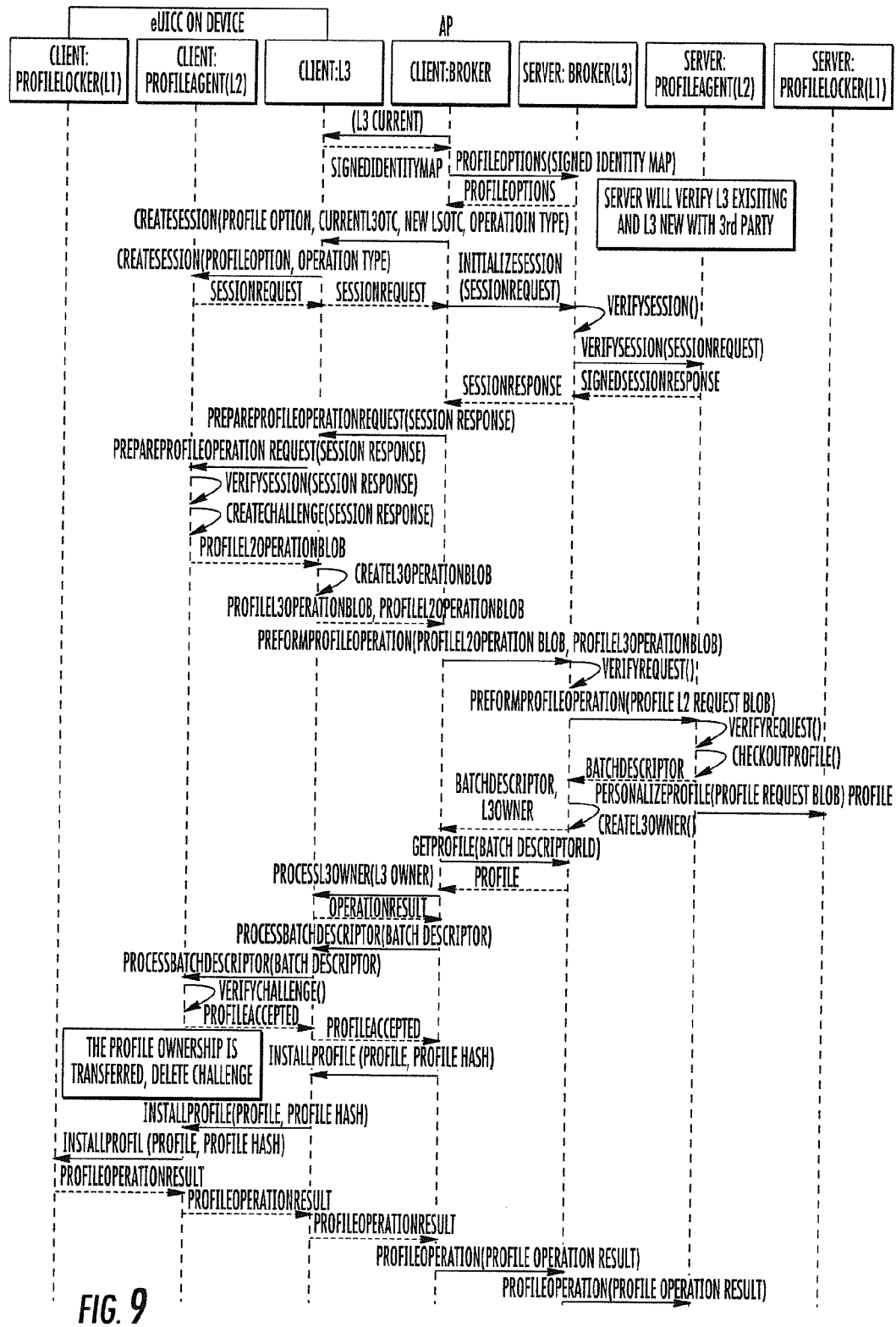
FIG. 9 is a logical flow diagram illustrating one exemplary logical sequence for delivering an eSIM to a device without personalization.

FIG. 9 illustrates one exemplary logical sequence for delivering an eSIM to a device without personalization. First, the device identifies the server broker via discovery process (not shown). Once the device attempts to communicate with the server broker, there are three main operations: (i) the device queries the server backend about available eSIM options; (ii) the device requests that the server personalizes an eSIM if the requested eSIM has not been pre-personalized; and (iii) the device downloads the actual eSIM and install it.

In the first stage, getProfileOptions is used by the device to query the server backend about available eSIM options. The eUICC associated with the device is identified by its UniqueId, which for example can be the card serial number. The broker utilizes sales information to determine one or more eSIM options available to the device. For unlocked devices, there may be a very large set of available eSIMs; thus, in some embodiments, common options that are likely to be chosen by the user are displayed (e.g., based on location, cost, etc.). The server returns an array of profile providers (MNO) and profile types (e.g. prepaid/postpaid) that is valid for the device.

In some scenarios, the type of eSIMs available to the user may be considered private information, therefore in some variants the getProfileOptions API further requires the device eUICC L3 to sign the unique identifier of the eUICC, and include the signed identifier in the API. The server broker (or broker server) can verify the signature before processing the request. This prevents a malicious party from retrieving users' profile options by sending the masqueraded requests. In some variants, the communication between the device broker and the server broker uses a security protocol (e.g., transport layer security (TLS)) to prevent capture and replay attacks.

In one embodiment, a getProfileOptions contains two L3 tokens to verify the current and new ownership of the eSIM. The current L3 token may be a unique identifier or so-called "faux card" scratch code. The new L3 token can be information used to associate a user account with an eSIM, for example, a sign-on token for an iCloud account (e.g., where the device has logged into a user account to retrieve a token). Both L3 tokens are signed by the eUICC L3. The server broker validates the L3 tokens using an associated authentication service. For example, it may communicate with a network server (e.g., the Assignee's iCloud server) or a third party service to validate the sign-on token.

To optimize performance and avoid duplicate authentication, after authenticating the token passed by the device, the server broker generates a one time code (OTC) and pass the OTC back to the device. The device can use the OTC as a proof that the server has already performed L3 authentication. The complete data binary large object (BLOB) may include the generated OTC, unique device identifier (e.g. card serial number (CSN)), principal, service provider, and a timestamp to indicate validity of the OTC. The BLOB is hashed and signed by the broker. In one variant, the hashing is performed with a symmetric key to improve overall performance. If getProfileOptions returns an array of eSIMs, the user is prompted to make a selection.

In the second stage, the device would call personalizeProfile to request the server backend to personalize an eSIM. Before the device sends the personalization request to the server, there is a session handshake between the eUICC profile agent and server profile agent for authentication. The device broker and eUICC create a session, based on the profile option that the user has chosen, and the current L3 code and new L3 code sent by the server broker. The eUICC can save this information to fill in the profile request sent subsequently thereafter. The eUICC profile agent generates a session id, which will be echoed back by the server agent for authentication subsequent thereto.

The device broker can now pass a session request generated by eUICC to the server broker. The server broker can check the request. For example, the server broker determines if the requesting eUICC, represented by unique ID, is serviceable. Since the unique identifier is included in plaintext, the server broker can retrieve the information even though a more thorough verification of the request is performed by server profile agent.

If the request is appropriate, then the server broker passes the request to the profile agent. The profile agent verifies the request cryptographically, by verifying the eUICC L2 certificate and using the eUICC L2 public key to verify the L2 signature. Once verification passes, the server profile agent creates a SessionResponse, including a plaintext section containing: the received session identifier and unique identifier, a L2 signature (generated by hashing the plain text section and signing the hash using server profile agent's private key), and the server profile agent's certificate.

The session response is sent from server profile agent to the server broker, which then forwards the session response to the device broker. The device broker passes the response to the eUICC in a prepareProfileRequest message. The eUICC L2 verifies the sessionReponse by verifying the server profile agent's certificate and the L2 signature. The eUICC L2 also verifies that the session identifier and unique identifier match the information in eUICC. Once verification passes, the eUICC creates a challenge for the personalized profile request. The challenge is committed to non-volatile memory. The eUICC then creates the profile request BLOB, including L1, L2 and L3 related information. Detailed structures are listed in APPENDIX A hereto, incorporated by reference herein.

Thereafter, the profile request BLOB is sent to the server backend. The server broker performs L3 verification and includes L3 owner information (e.g. principal and service provider) to associate the eSIM with; the server profile agent creates a batch descriptor, and the server profile locker personalizes the eSIM for the eUICC. The personalized eSIM may be distributed to a content delivery network (CDN) for performance optimization.

After the device broker receives the profile descriptor and associated L3 owner information, it retrieves the associated profile via getProfile by providing the received GUID (Globally Unique Identifier).

Once the device broker has retrieved a profile descriptor and profile, it instructs the client eUICC to install the eSIM. The call flows shows three separate calls, processL3Owner, processProfileDescriptor and installProfile, however it is appreciated that in actual implementation, these three logical calls can be combined within a single transaction. The eUICC performs L3, L2, and L1 verification; once verified, the eSIM is installed. The associated challenge is deleted. The L3 Owner information is saved together with the eSIM to indicate proper ownership. L3 Owner information can be provided at a later point if the user exports the eSIM.

Once the profile is installed, the eUICC returns the installation results to the server. Server infrastructure can use the notification to trigger a purge of cached content in the content delivery network (CDN). In some cases, this information may also be used for notification services indicating e.g., successful installation, partial installation, unsuccessful installation, etc.

eSIM Delivery, Pre-personalization—

Figure 10A:
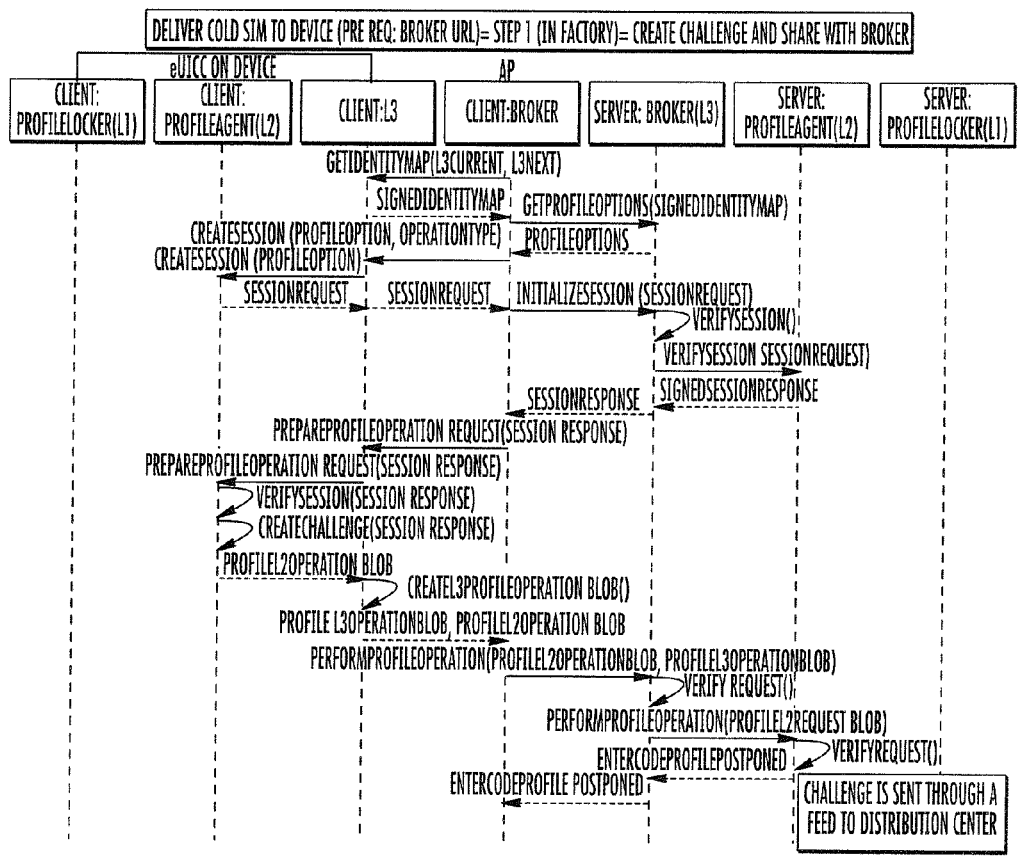
FIG. 10 is a logical flow diagram illustrating one exemplary logical sequence for delivering an eSIM to a device with pre-personalization.
Figure 10B:
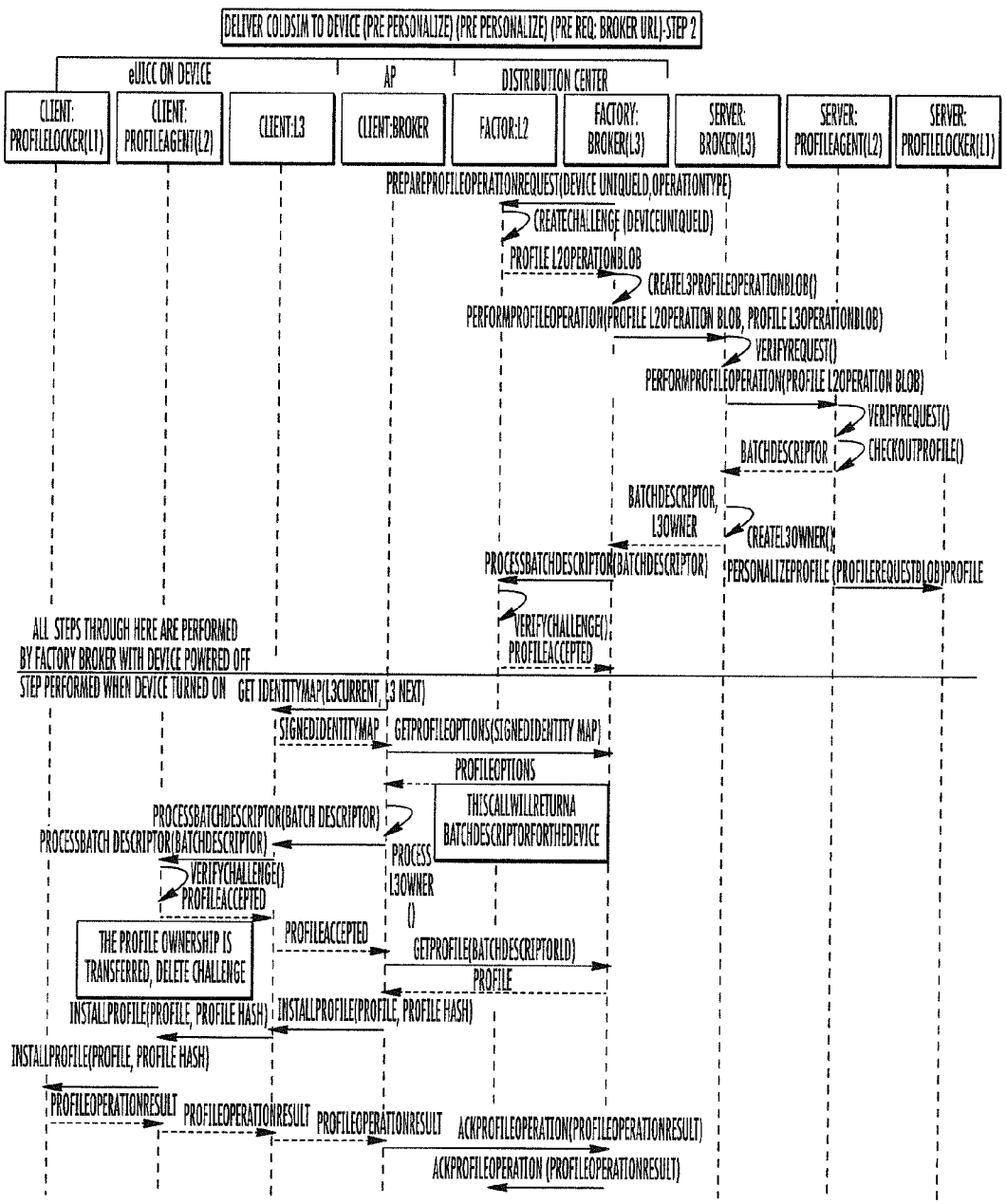

FIG. 10 illustrates one exemplary logical sequence for delivering an eSIM to a device with pre-personalization. Similar to the scheme of FIG. 9, delivering a pre-personalized eSIM requires three (3) stages.

Initially, during manufacture of the client device, a factory broker instructs the eUICC to create a challenge for eSIM pre-personalization later. However, unlike the scheme of FIG. 9, the device is not yet associated with a MNO, or eSIM type; rather these fields are populated with a special value to indicate that a selection will be made later. The complete content of the profile request BLOB is saved for personalization use later.

The second stage is triggered automatically by e.g., shipment notification, device sale, etc. The L2 (client profile agent) in the distribution center acts as a proxy for the client eUICC L2. While the eUICC profile request BLOB does not contain a MNO and eSIM type, the client profile agent can regenerate the BLOB by replacing these fields with updated information. The client profile agent can create its own challenge and replace the eUICC challenge. The client profile agent will sign the content with its own private key (otherwise all L2s would require unique challenges). The BLOB will contain the eUICC's L1 signature, the eUICC still needs to decrypt the personalized eSIM. The new profile request BLOB is sent to the server broker using the existing personalizeProfile request. Hereinafter, the procedure is no different than the procedure of FIG. 9.

Moreover, it is further appreciated that even if a MNO would like to support its own brokering system, the disclosed pre-personalization process can use the same interface. The server broker will return a batch descriptor to the client and personalize the eSIM. The client profile agent would create a new batch descriptor with the eUICC's challenge, to be used when the eUICC requests the profile later.

Finally, in the last stage, when the user powers up the device, the device performs getProfileOptions to check available eSIM options. As an eSIM is already pre-personalized, the response would include a valid batch descriptor and the device no longer needs to call personalizeProfile. It would use information in the descriptor to directly retrieve the eSIM via getProfile request.

eSIM Delivery, Batch Delivery—

Figure 11:
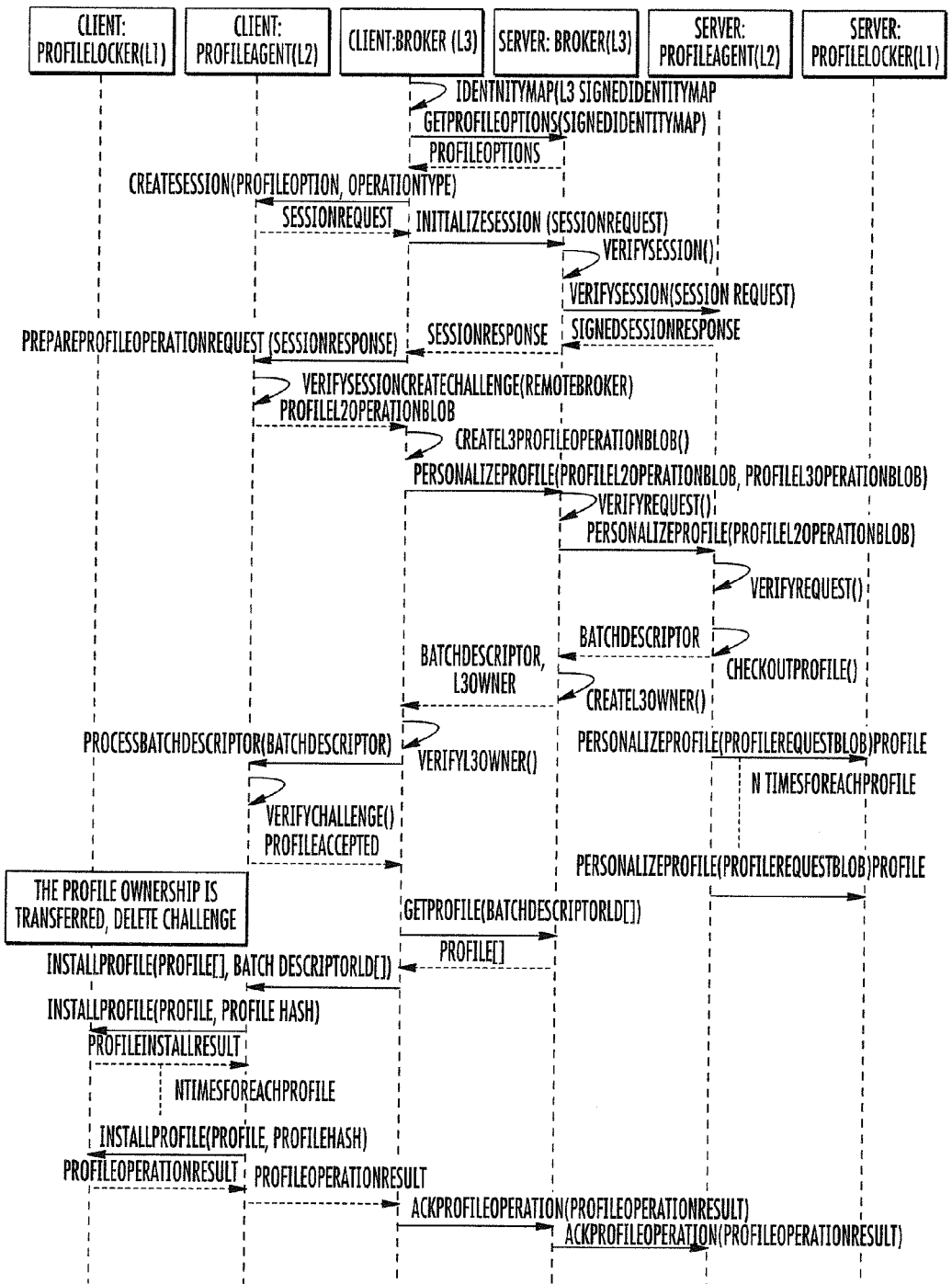
FIG. 11 is a logical flow diagram illustrating one exemplary logical sequence for delivering a batch of eSIMs to a device.

FIG. 11 illustrates one exemplary logical sequence for delivering a large number (batch) of eSIMs e.g., between two entities. In one embodiment, the client broker and server broker are secure entities which have a secure communication via e.g., Virtual Private Network (VPN). "Batching" is supported such that a client may place an order for a large quantity of eSIMs.

In this scenario, when the profile agent receives a request to personalize profiles, the profiles do not need to be personalized if the batch descriptor is returned; rather, the client may request actual profiles at a later stage as desired. In batch descriptor operation, the hash of profile content is calculated over the encrypted profile (wrapped with a symmetric key) and profile metadata, neither of which requires profile to be personalized. This also does not require L1 to store the symmetric key per eUICC, which would otherwise burden L1 with additional storage requirement that is difficult to meet. In one embodiment, the encrypted eSIM (wrapped with a symmetric key) can be stored off-storage. The symmetric key would be wrapped with a L1 RFS (remote file system) key and the wrapped key may be saved in off-storage together with the encrypted eSIM.

eSIM Export—

Finally, once an eSIM is stored to a client device, the user may choose to export an eSIM off the device and later import the eSIM to the same or a different device. One objective is to support eSIM swap. Another objective is to free up eUICC memory to store additional eSIMs. When exporting, there are three possible scenarios: (i) exporting to a cloud, (ii) exporting to an AP (for off-board storage), and (iii) device-to-device eSIM transfer. Similarly, the user may import from a cloud, AP, or another device.

During eSIM installation, user account information is associated to the eSIM (unless the user opts out). The account information includes sufficient information for L3 authentication. For example, it may include a principal (e.g. x2z@yahoo.com) and the associated service provider for authentication. If no account information is associated with the eSIM, the user may export the eSIM with other authentication methods. One such embodiment, includes a physical button that is securely connected to eUICC to prove physical possession of the device. In another embodiment, each eSIM includes a unique password, the user must have the password to prove their ownership. Using OEM credentials is yet another option.

When the user exports an eSIM, the AP retrieves a list of installed profiles from eUICC; for each profile, eUICC also returns the associated principal and a nonce generated for anti-replay. When the user chooses to export a profile, the AP uses information contained in the principal to obtain a single sign-on (SSO) token from the service provider, where the user would be prompted to enter username and password for the purpose. The SSO token is passed together with principal and nonce to the server broker in export request. The server broker can process the authentication with the service provider, using the SSO token supplied by the device. Once authentication passes, the flow mirrors eSIM delivery to the device, except that the client and server roles are reversed. At a high level, the server broker initiates a session with the eUICC, creates a request BLOB for the export. In the request, it includes the nonce that the eUICC generated, to indicate that the operation has passed L3 authentication. The eUICC verifies the request BLOB, encrypts the eSIM with the server agent's public key, creates a batch descriptor and L3 owner information for the eSIM. The eSIM together with L3 and L2 information can be sent to the server.

Once eUICC encrypts the eSIM for export, the eUICC gives up ownership of the eSIM and no longer uses the eSIM or exports the eSIM to any other entities. In some cases, the eUICC may save the encrypted copy to help recovery from connection loss (i.e., if the encrypted eSIM never reached the server). Alternatively, the AP may save a copy of the encrypted eSIM for retransmission in the event of a connection failure. Servers may return acknowledgements which triggers the AP to clean up the stored copy.

In some embodiments, export can also be initiated from a web portal. If the user loses his device, he may use a web portal to export eSIMs from his device. In this case, the web portal would communicate with the device to initiate export operation. The flow is similar except that the user would use web portal instead of AP to obtain the SSO token for ownership verification.

Apparatus—

Various apparatus useful in conjunction with the above described methods are now described in greater detail.

eUICC Appliance—

Figure 12:
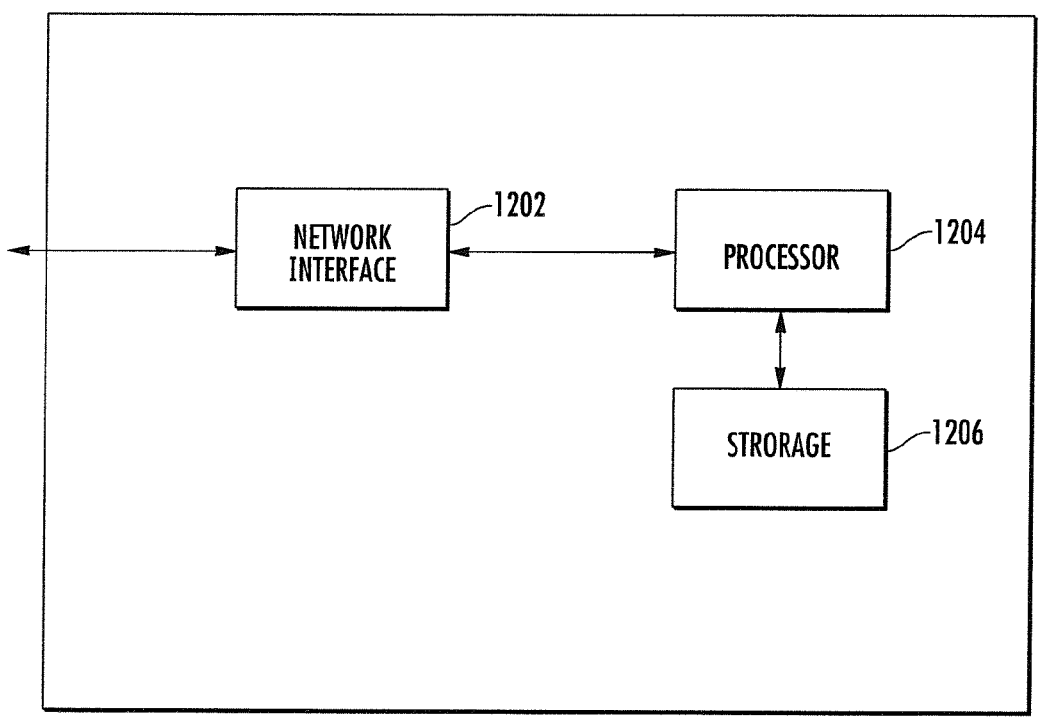
FIG. 12 is a logical representation of an electronic Universal Integrated Circuit Card (eUICC) apparatus.

FIG. 12 illustrates one exemplary embodiment of a eUICC appliance 1200 in accordance with the present disclosure. The eUICC appliance may comprise a stand-alone entity, or be incorporated with other network entities such as e.g., servers. As shown, the eUICC appliance 1200 generally includes a network interface 1202 for interfacing with the communications network, a processor 1204, and one or more storage apparatus 1206. The network interface is shown connecting to the MNO infrastructure, so as to provide access to other eUICC appliances, and direct or indirect access to one or more mobile devices, although other configurations and functionalities may be substituted.

In one configuration, the eUICC appliance is capable of: (i) establishing communications with another eUICC (either a eUICC appliance or client device), (ii) securely storing an eSIM, (iii) retrieving a securely stored eSIM, (iv) encrypting an eSIM for delivery to another specific eUICC, and (v) sending multiple eSIMs to/from an eSIM depot.

eSIM Depot—

Figure 13:
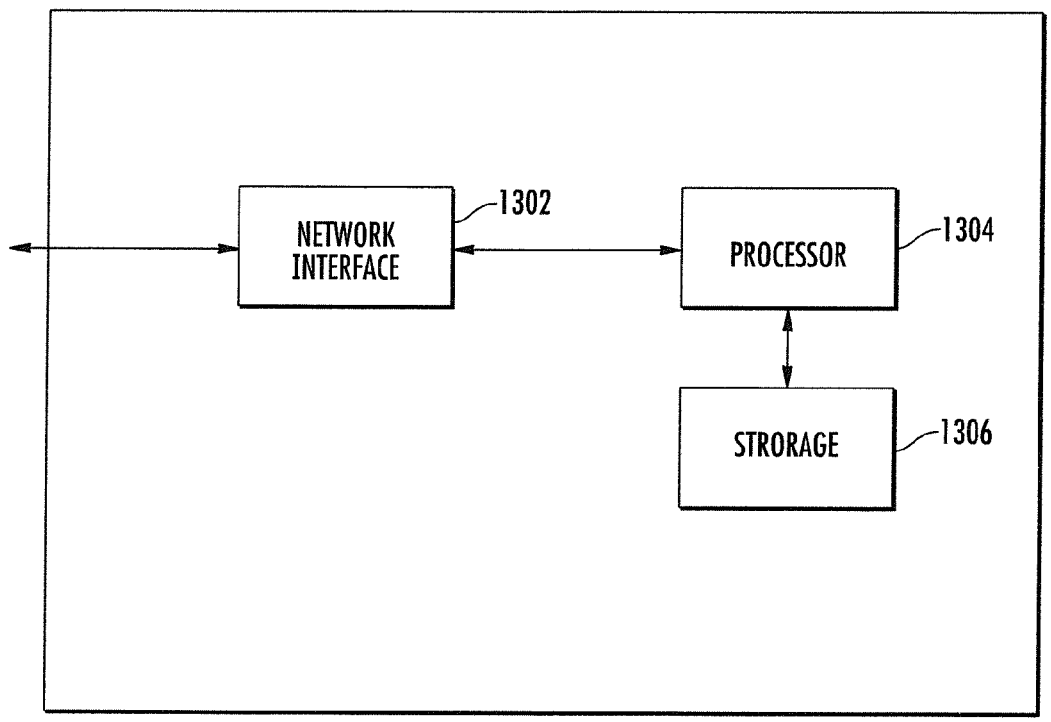
FIG. 13 is a logical representation of an electronic Subscriber Identification Module (eSIM) depot apparatus.

FIG. 13 illustrates one exemplary embodiment of an eSIM depot 1300 in accordance with the present disclosure. The eSIM depot 1300 may be implemented as a stand-alone entity, or be incorporated with other network entities (e.g., an eUICC appliance 1200, etc.). As shown, the eSIM depot 1300 generally includes a network interface 1302 for interfacing with the communications network, a processor 1304, and a storage apparatus 1306.

In the illustrated embodiment of FIG. 1300, the eSIM depot 304 is capable of: (i) inventory management of eSIMs (e.g., via associated metadata), (ii) responding to requests for encrypted eSIMs (e.g., from other eSIM depots, and/or eUICC appliances 1200), (iii) managing subscriber requests for eSIMs.

For example, when an eSIM is stored at an eSIM depot 1300 by a user, the eSIM may be stored with an intended destination (e.g., to facilitate transfer to another device), or parked indefinitely. In either case, the eSIM depot can provide the eSIM to the eUICC appliance for secure storage and for subsequent encryption for the destination device.

User Apparatus—

Figure 14:
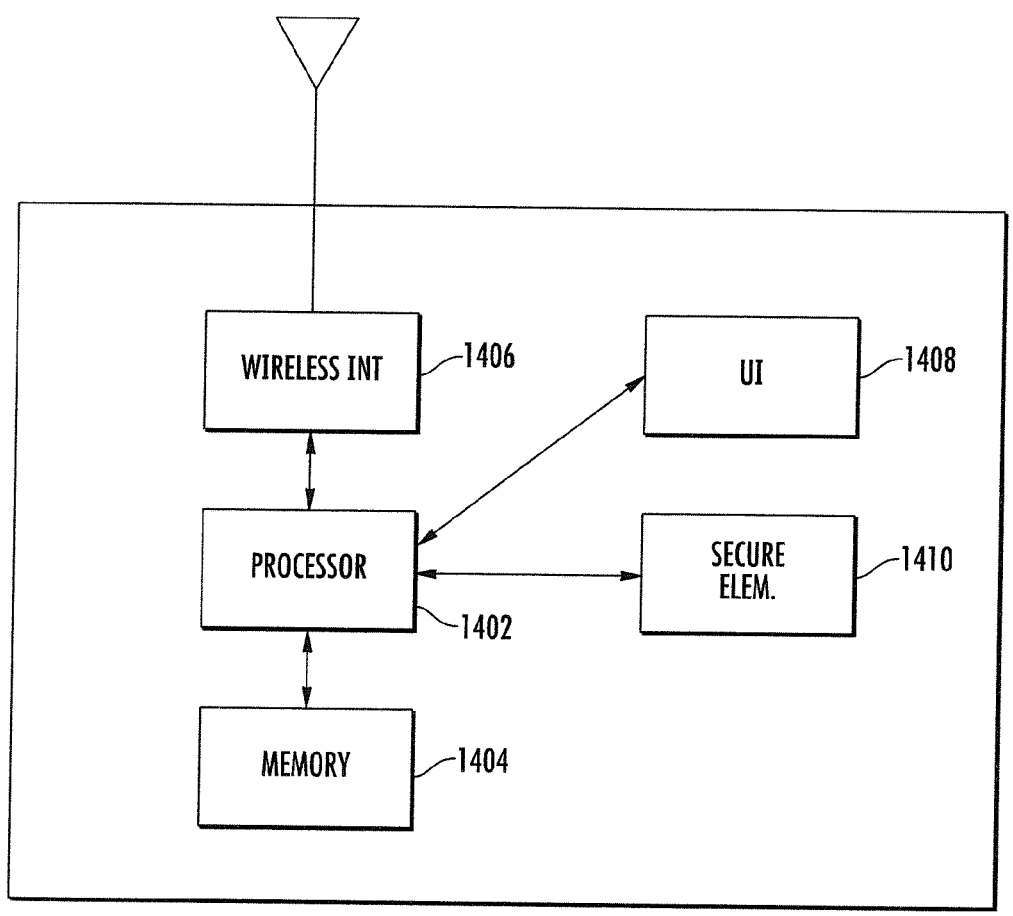
FIG. 14 is a logical flow diagram illustrating one exemplary user apparatus.

Referring now to FIG. 14, exemplary user apparatus 1400 in accordance with various aspects of the present disclosure is illustrated.

The exemplary UE apparatus of FIG. 14 is a wireless device with a processor subsystem 1402 such as a digital signal processor, microprocessor, field-programmable gate array, or plurality of processing components mounted on one or more substrates. The processing subsystem may also comprise an internal cache memory. The processing subsystem is in communication with a memory subsystem 1404 including memory which may for example, comprise SRAM, flash, and/or SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device includes one or more wireless interfaces 1406 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems of the type well known in the wireless arts.

The user interface subsystem 1408 includes any number of well-known 110 including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 1410 which contains and operates the eUICC application. The eUICC is capable of storing and accessing a plurality of access control clients to be used for authentication with a network operator. The secure element includes a secure processor executing software stored in a secure media. The secure media is inaccessible to all other components (other than the secure processor). Moreover, the exemplary secure element may be further hardened to prevent tampering (e.g., encased in resin) as previously described. The exemplary secure element 1410 is capable of receiving and storing one or more access control clients. In one embodiment, the secure element stores an array or plurality of eSIMs associated with a user (e.g., one for work, one for personal, several for roaming access, etc.), and/or according to another logical scheme or relationship (e.g., one for each of multiple members of a family or business entity, one for each of personal and work use for the members of the family, and so forth). Each eSIM includes a small file system including computer readable instructions (the eSIM program), and associated data (e.g., cipher keys, integrity keys, etc.)

The secure element is further adapted to enable transfer of eSIMs to and/or from the mobile device. In one implementation, the mobile device provides a GUI-based acknowledgement to initiate transfer of an eSIM.

Once the user of the mobile device opts to activate an eSIM, the mobile device sends a request for activation to an activation service. The mobile device can use the eSIM for standard Authentication and Key Agreement (AKA) exchanges.

Methods—

Various methods useful in conjunction with the above described methods are now described in greater detail.

Figure 15:
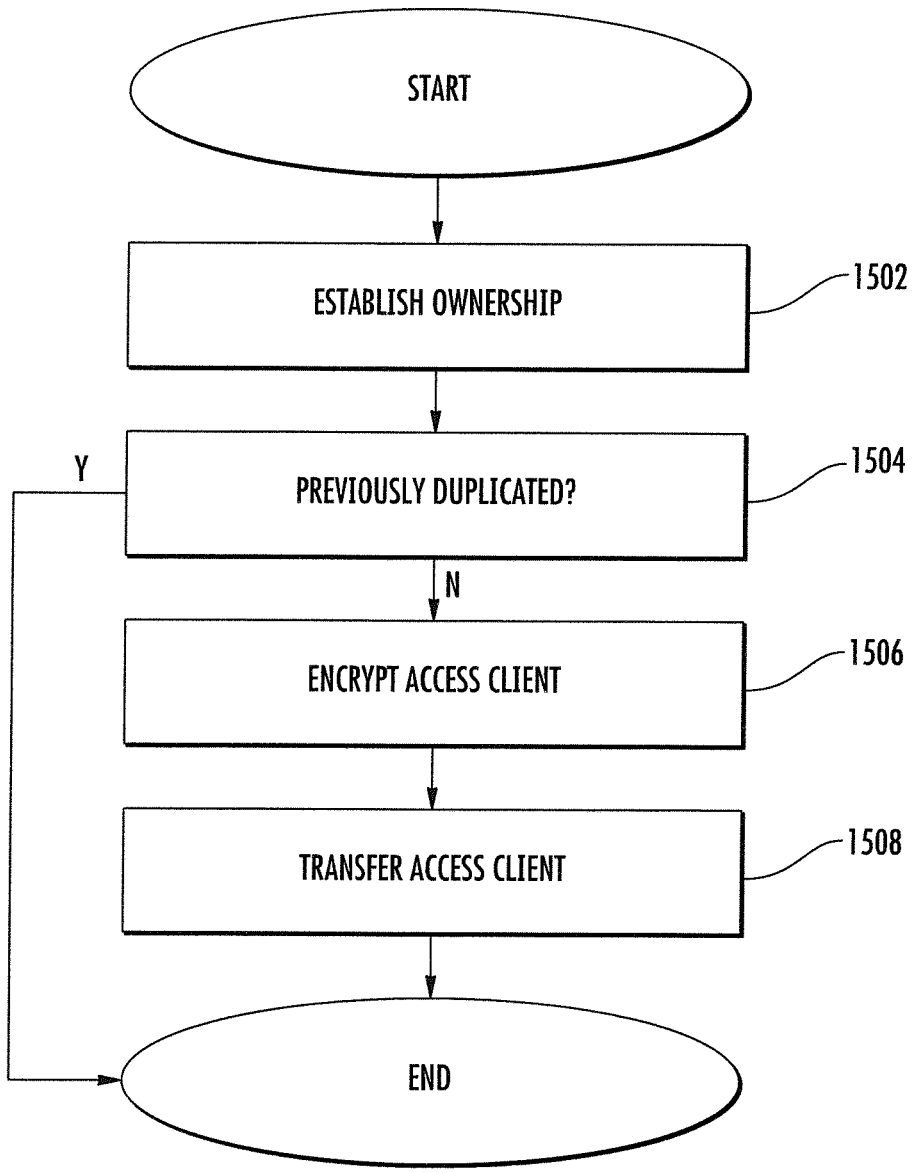
FIG. 15 is a logical flow diagram illustrating one embodiment of a method for large scale distribution of electronic access control clients.

FIG. 15 illustrates one embodiment of a method for large scale distribution of electronic access control clients.

At step 1502, a first device establishes ownership of one or more electronic access control clients.

At step 1504, the first device determines if one or more electronic access control clients have not been previously duplicated.

At step 1506, the first device encrypts the one or more electronic access control clients for transfer to the second device.

At step 1508, the first device and second device exchange or transfer the encrypted one or more electronic access control clients.

Myriad other schemes for large scale distribution of electronic access control clients will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims

What is claimed is:

1. A method for replacing compromised digital certificates associated with electronic Universal Integrated Circuit Cards (eUICCs) included in mobile devices, the method comprising:
at an eUICC management server:
receiving an indication that a signing authority associated with a plurality of digital certificates has been compromised; and
for each digital certificate of the plurality of digital certificates:
identifying (i) an eUICC associated with the digital certificate, and (ii) a mobile device in which the eUICC is included,
identifying a public key ($PK_{eUICC}$) that (i) corresponds to the eUICC, and (ii) is associated with the digital certificate,
causing an updated digital certificate to be generated, wherein the updated digital certificate is based on the $PK_{eUICC}$ and an updated private key ($SK_{Updated\_SA}$) that corresponds to the signing authority, and
causing the eUICC to replace the digital certificate with the updated digital certificate.

2. The method of claim 1, wherein, for each digital certificate of the plurality of digital certificates, the digital certificate includes a first epoch property, and the updated digital certificate includes a second epoch property.

3. The method of claim 2, wherein:
when the second epoch property indicates the updated digital certificate is newer than the digital certificate, the mobile device causes the eUICC to replace the digital certificate with the updated digital certificate, and
when the second epoch property indicates the updated digital certificate is older than the digital certificate, the mobile device does not replace the digital certificate with the updated digital certificate.

4. The method of claim 1, wherein, for each digital certificate of the plurality of digital certificates, identifying the $PK_{eUICC}$ comprises obtaining a Certificate Signing Request (CSR) that originally caused the digital certificate to be generated.

5. The method of claim 4, wherein, for each digital certificate of the plurality of digital certificates, the digital certificate and the updated digital certificate are associated with (i) the $PK_{eUICC}$, and (ii) a private key ($SK_{eUICC}$) that corresponds to the $PK_{eUICC}$.

6. The method of claim 1, wherein:
for each digital certificate of the plurality of digital certificates, the digital certificate is digitally signed using an original private key ($SK_{Original\_SA}$) that corresponds to the signing authority, and the $SK_{Original\_SA}$ is compromised.

7. The method of claim 6, wherein the $SK_{Updated\_SA}$ is generated by the signing authority in response to a corruption of the $SK_{Original\_SA}$.

8. A non-transitory computer readable storage medium configured to store instructions that, when executed by a processor included in an electronic Universal Integrated Circuit Card (eUICC) management server, cause the eUICC management server to replace compromised digital certificates associated with electronic Universal Integrated Circuit Cards (eUICCs) included in mobile devices, by carrying out steps that include:
   receiving an indication that a private key ($SK_{SA}$) associated with a signing authority has been compromised;
   identifying a plurality of digital certificates that are digitally signed using the $SK_{SA}$, wherein each digital certificate corresponds to a different mobile device; and
   for each digital certificate of the plurality of digital certificates:
      identifying an eUICC included in the mobile device that corresponds to the digital certificate,
      identifying a public key ($PK_{eUICC}$) that corresponds to the eUICC,
      causing an updated digital certificate to be generated, wherein the updated digital certificate is based on the $PK_{eUICC}$ and an updated private key ($SK_{Updated\_SA}$) that corresponds to the signing authority, and
      causing the eUICC to replace the digital certificate with the updated digital certificate.

9. The non-transitory computer readable medium of claim 8, wherein, for each digital certificate of the plurality of digital certificates, the digital certificate includes a first epoch property, and the updated digital certificate includes a second epoch property.

10. The non-transitory computer readable medium of claim 9, wherein:
   when the second epoch property indicates the updated digital certificate is newer than the digital certificate, the mobile device causes the eUICC to replace the digital certificate with the updated digital certificate, and
   when the second epoch property indicates the updated digital certificate is older than the digital certificate, the mobile device does not replace the digital certificate with the updated digital certificate.

11. The non-transitory computer readable medium of claim 8, wherein, for each digital certificate of the plurality of digital certificates, identifying the $PK_{eUICC}$ comprises obtaining a Certificate Signing Request (CSR) that originally caused the digital certificate to be generated.

12. The non-transitory computer readable medium of claim 11, wherein, for each digital certificate of the plurality of digital certificates, the digital certificate and the updated digital certificate are associated with (i) the $PK_{eUICC}$, and (ii) a private key ($SK_{eUICC}$) that corresponds to the $PK_{eUICC}$.

13. The non-transitory computer readable medium of claim 8, wherein:
   for each digital certificate of the plurality of digital certificates, the digital certificate is digitally signed using an original private key ($SK_{Original\_SA}$) that corresponds to the signing authority, and the $SK_{Original\_SA}$ is compromised.

14. The non-transitory computer readable medium of claim 13, wherein the $SK_{Updated\_SA}$ is generated by the signing authority in response to a corruption of the $SK_{Original\_SA}$.

15. An electronic Universal Integrated Circuit Card (eUICC) management server configured to replace compromised digital certificates associated with electronic Universal Integrated Circuit Cards (eUICCs) included in mobile devices, the eUICC management server comprising:
   a processor; and
   a memory configured to store instructions that, when executed by the processor, cause the eUICC management server to carry out steps that include:
      receiving an indication that a private key ($SK_{SA}$) associated with a signing authority has been compromised;
      identifying a plurality of digital certificates that are digitally signed using the $SK_{SA}$, wherein each digital certificate corresponds to a different mobile device; and
      for each digital certificate of the plurality of digital certificates:
         identifying an eUICC included in the mobile device that corresponds to the digital certificate,
         identifying a public key ($PK_{eUICC}$) that corresponds to the eUICC,
         causing an updated digital certificate to be generated, wherein the updated digital certificate is based on the $PK_{eUICC}$ and an updated private key ($SK_{Updated\_SA}$) that corresponds to the signing authority, and
         causing the eUICC to replace the digital certificate with the updated digital certificate.

16. The eUICC management server of claim 15, wherein, for each digital certificate of the plurality of digital certificates, the digital certificate includes a first epoch property, and the updated digital certificate includes a second epoch property.

17. The eUICC management server of claim 16, wherein:
   when the second epoch property indicates the updated digital certificate is newer than the digital certificate, the mobile device causes the eUICC to replace the digital certificate with the updated digital certificate, and
   when the second epoch property indicates the updated digital certificate is older than the digital certificate, the mobile device does not replace the digital certificate with the updated digital certificate.

18. The eUICC management server of claim 15, wherein, for each digital certificate of the plurality of digital certificates, identifying the $PK_{eUICC}$ comprises obtaining a Certificate Signing Request (CSR) that originally caused the digital certificate to be generated.

19. The eUICC management server of claim 18, wherein, for each digital certificate of the plurality of digital certificates, the digital certificate and the updated digital certificate are associated with (i) the $PK_{eUICC}$, and (ii) a private key ($SK_{eUICC}$) that corresponds to the $PK_{eUICC}$.

20. The eUICC management server of claim 15, wherein:
   for each digital certificate of the plurality of digital certificates, the digital certificate is digitally signed using an original private key ($SK_{Original\_SA}$) that corresponds to the signing authority, and the $SK_{Original\_SA}$ is compromised.

* * * * *